United States Patent
Saida et al.

(10) Patent No.: US 10,713,488 B2
(45) Date of Patent: Jul. 14, 2020

(54) INSPECTION SPOT OUTPUT APPARATUS, CONTROL METHOD, AND STORAGE MEDIUM

(71) Applicant: NEC Corporation, Minato-ku, Tokyo (JP)

(72) Inventors: Yoshinori Saida, Tokyo (JP); Shin Norieda, Tokyo (JP); Makoto Yoshimoto, Tokyo (JP); Kota Iwamoto, Tokyo (JP); Takami Sato, Tokyo (JP); Ruihan Bao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 67 days.

(21) Appl. No.: 15/759,560

(22) PCT Filed: Sep. 7, 2016

(86) PCT No.: PCT/JP2016/076249
§ 371 (c)(1),
(2) Date: Mar. 13, 2018

(87) PCT Pub. No.: WO2017/081920
PCT Pub. Date: May 18, 2017

(65) Prior Publication Data
US 2019/0156118 A1    May 23, 2019

(30) Foreign Application Priority Data
Nov. 10, 2015    (JP) .................. 2015-220320

(51) Int. Cl.
*G06K 9/00* (2006.01)
*G06F 3/147* (2006.01)
(Continued)

(52) U.S. Cl.
CPC ..... *G06K 9/00671* (2013.01); *G02B 27/0172* (2013.01); *G06F 3/14* (2013.01);
(Continued)

(58) Field of Classification Search
CPC .......................... G02B 27/01; G02B 27/0138; G02B 27/0141; G06F 3/14; G09G 2354/00; G06K 9/0061; G06Q 10/20
See application file for complete search history.

(56) References Cited

U.S. PATENT DOCUMENTS

2007/0129914 A1    6/2007    Yano et al.
2009/0295712 A1*   12/2009   Ritzau .................. G06F 1/1626
                                                          345/156
(Continued)

FOREIGN PATENT DOCUMENTS

JP    2002-007600 A    1/2002
JP    2005-267161 A    9/2005
(Continued)

OTHER PUBLICATIONS

International Search Report for PCT Application No. PCT/JP2016/076249, dated Nov. 8, 2016.
(Continued)

*Primary Examiner* — Michelle L Sams

(57) ABSTRACT

An image acquisition unit (2020) acquires a captured image containing an inspection target instrument. An inspection information acquisition unit (2040) acquires inspection information regarding the instrument contained in the captured image. The inspection information is information indicating an inspection item of the instrument. A first display control unit (2060) displays an indication representing an inspection spot corresponding to the inspection item indicated by the inspection information on the display device (10). For example, the first display control unit (2060) displays the indication representing the inspection spot so that the indication is superimposed on the inspection spot on a display device (10). For example, the first display (Continued)

control unit (2060) displays the indication in the inspection spot on the display device (10) or near the instrument.

15 Claims, 30 Drawing Sheets

(51) Int. Cl.
*G06Q 10/00* (2012.01)
*G06T 19/00* (2011.01)
*G02B 27/01* (2006.01)
*G06F 3/14* (2006.01)

(52) U.S. Cl.
CPC ............ *G06F 3/147* (2013.01); *G06Q 10/20* (2013.01); *G06T 19/006* (2013.01); *G02B 2027/014* (2013.01); *G02B 2027/0141* (2013.01); *G09G 2354/00* (2013.01); *G09G 2380/06* (2013.01)

(56) References Cited

U.S. PATENT DOCUMENTS

| | | | | |
|---|---|---|---|---|
| 2011/0164163 A1* | 7/2011 | Bilbrey | ............... | G06F 1/1694 348/333.01 |
| 2013/0201217 A1* | 8/2013 | Morinaga | ........... | G06F 3/04815 345/633 |
| 2015/0026636 A1 | 1/2015 | Kawano | | |
| 2015/0170393 A1* | 6/2015 | Tada | ....................... | G06T 11/60 345/633 |
| 2015/0192774 A1* | 7/2015 | Watanabe | ........... | B65G 1/1375 345/8 |
| 2015/0220762 A1 | 8/2015 | Jiang et al. | | |
| 2017/0004827 A1* | 1/2017 | Bancalari | ................ | G06F 1/163 |

FOREIGN PATENT DOCUMENTS

| | | |
|---|---|---|
| JP | 4620030 B2 | 1/2011 |
| JP | 2014-071756 A | 4/2014 |
| JP | 2015-148835 A | 8/2015 |
| WO | 2013/157322 A1 | 10/2013 |

OTHER PUBLICATIONS

International Preliminary Report on Patentability for PCT Application No. PCT/JP2016/076249, dated Jan. 11, 2018.

* cited by examiner

FIG. 4
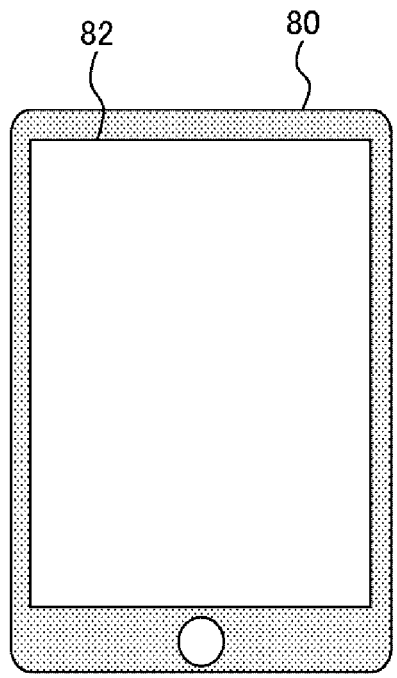
FRONT SURFACE
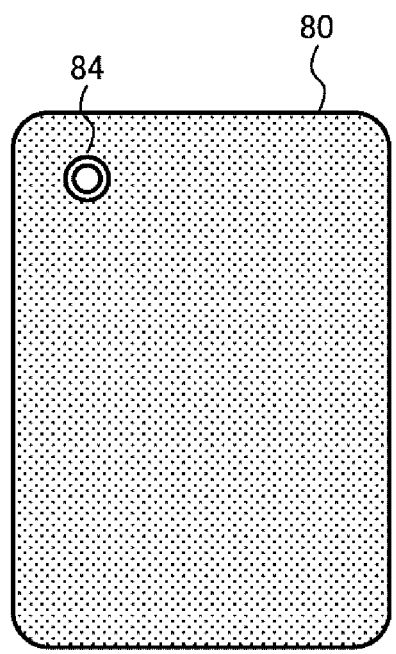
BACK SURFACE

FIG. 7

| 202 INSPECTION ITEM ID | 204 INSPECTION ITEM NAME | 206 INSPECTION CONTENT | 207 INPUT FORMAT | 208 INSPECTION SPOT | 210 DISPLAY IMAGE |
|---|---|---|---|---|---|
| 0000 | — | — | — | | INSPECT SWITCHBOARD PANEL 3-A |
| 0001 | VOLTMETER 1 | CONFIRM WITHIN NORMAL VALUE (10 TO 15 V) | OK/NG | | CONFIRM WITHIN NORMAL VALUE / No. 1 INSPECTION ITEM: CONFIRM WITHIN NORMAL VALUE (10 TO 15 V) / INPUT: OK/NG |
| ... | ... | ... | ... | ... | ... |
| 0006 | LEVER | INPUT SETTING VALUE | 1-5 | | INPUT SETTING VALUE / No. 6 INSPECTION ITEM: INPUT SETTING VALUE / INPUT: 1-5 |
| 0007 | SWITCH | INPUT ON/OFF | ON/OFF | | INPUT ON/OFF / No. 7 INSPECTION ITEM: INPUT ON/OFF / INPUT: ON/OFF |

200

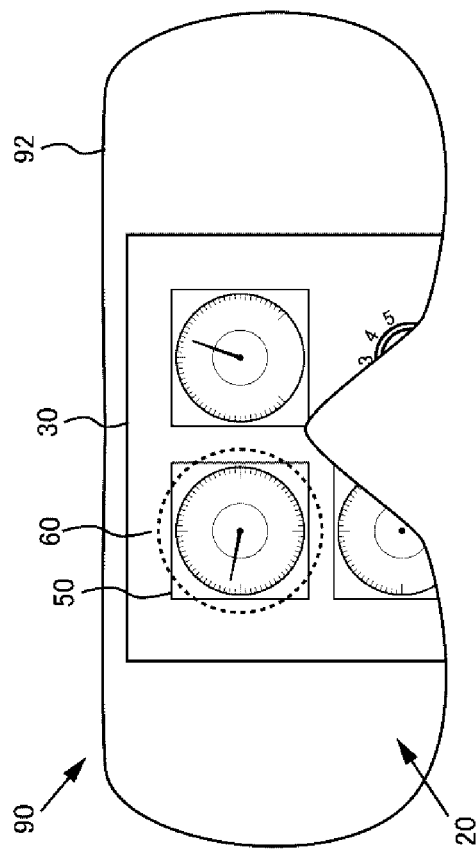
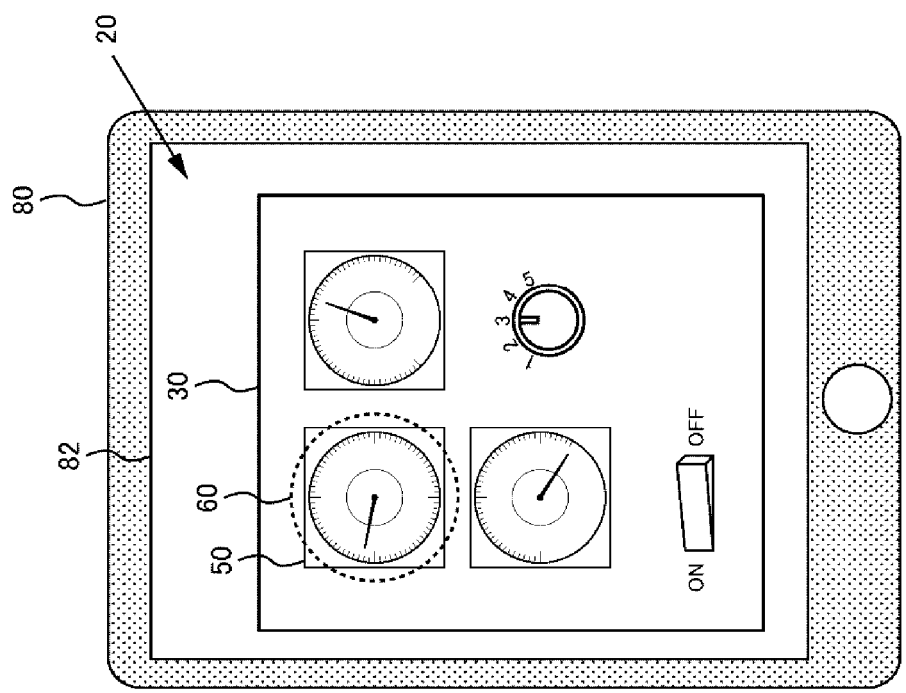

FIG. 17
| INSPECTION ITEM ID 202 | INSPECTION ITEM NAME 204 | INSPECTION CONTENT 206 | INPUT FORMAT 207 | INSPECTION SPOT 208 | DISPLAY IMAGE 210 | INTERFACE IMAGE 212 |
|---|---|---|---|---|---|---|
| 0000 | – | – | – | 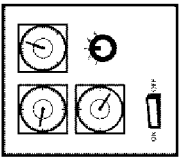 | ⋮ | ⋮ |
| 0001 | | | OK/NG | 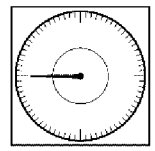 | ⋮ | if001.png |
| ⋮ | ⋮ | ⋮ | ⋮ | ⋮ | ⋮ | ⋮ |
| 0006 | | | 1–5 | 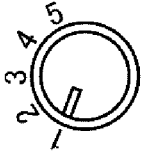 | ⋮ | NUMERIC KEY |
| 0007 | | | ON/OFF |  | ⋮ | if002.png |
200

INSPECTION SPOT OUTPUT APPARATUS, CONTROL METHOD, AND STORAGE MEDIUM

This application is a National Stage Entry of PCT/JP2016/076249 filed on Sep. 7, 2016, which claims priority from Japanese Patent Application 2015-220320 filed on Nov. 10, 2015, the contents of all of which are incorporated herein by reference, in their entirety.

TECHNICAL FIELD

The present invention relates to an information processing apparatus, a control method, and a program.

BACKGROUND ART

In inspection of factory equipment or the like, information processing apparatuses are used. For example, Patent Document 1 discloses an equipment inspection support system in which a terminal device is used. Inspection workers carry terminal devices to execute inspection works. The terminal devices acquire inspection items from content storage units. The inspection workers execute inspection works on the inspection items acquired by the terminal devices.

RELATED DOCUMENT

Patent Document

[Patent Document 1] Japanese Patent No. 4620030

SUMMARY OF THE INVENTION

Technical Problem

There are a plurality of inspection spots on inspection target instruments in some cases. For example, a plurality of meters are included in one apparatus in some cases. In these cases, for example, an inspection worker records measured values of the plurality of meters.

In this way, when there are a plurality of inspection spots on an instrument, it is necessary for an inspection worker to execute the work while ascertaining to which inspection spot on the instrument each inspection item is related. Therefore, the inspection work becomes complicated compared to a case in which there is only one inspection spot on the instrument. Accordingly, a working burden on the inspection worker increases. Patent Document 1 does not disclose the working burden on the inspection work and does not disclose a method of reducing the working burden.

The invention is devised in view of the foregoing problem. An object of the invention is to provide a technology for reducing a working burden on an inspection worker.

Solution to Problem

According to an aspect of the invention, there is provided an information processing apparatus comprising: an image acquisition unit acquiring a captured image containing an instrument to be inspected; an inspection information acquisition unit acquiring inspection information indicating each inspection item of the instrument contained in the captured image; and a first display control unit displaying an indication representing an inspection spot corresponding to the inspection item indicated by the inspection information so that the indication is superimposed on the inspection spot on a display device or displays the indication in the inspection spot on the display device or near the instrument.

According to another aspect of the invention, a control method is a control method executed by a computer. The control method comprising: an image acquisition step of acquiring a captured image containing an instrument to be inspected; an inspection information acquisition step of acquiring inspection information indicating each inspection item of the instrument contained in the captured image; and a first display control step of displaying an indication representing an inspection spot corresponding to the inspection item indicated by the inspection information so that the indication is superimposed on the inspection spot on a display device or displays the indication in the inspection spot on the display device or near the instrument.

Advantageous Effects of Invention

The invention provides a technology for reducing a working burden on an inspection worker.

BRIEF DESCRIPTION OF THE DRAWINGS

The above-described object, other objects, features, and advantages are more apparent in preferred embodiments to be described below and the following drawings appended thereto.

FIG. 4 is a diagram illustrating a tablet terminal including a display device and a camera.

FIG. 7 is a diagram illustrating inspection information in a table format.

FIG. 8 are diagrams illustrating a scene in which an image of which indication is superimposed on a captured image is displayed on a display device.

FIG. 17 is a diagram illustrating inspection information indicating IDs and types of interface images.

DESCRIPTION OF EMBODIMENTS

Figure 1:
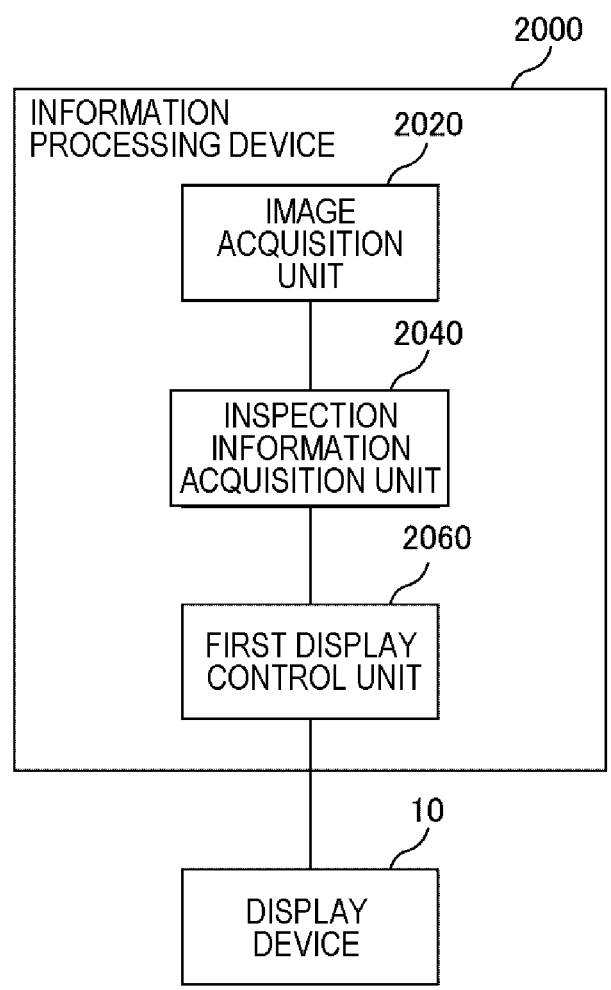
FIG. 1 is a block diagram illustrating an information processing apparatus according to a first example embodiment.

Hereinafter, embodiments of the invention will be described with reference to the drawings. Throughout all the drawings, the same reference numerals are given to the same constituent elements and the description thereof will be appropriately omitted. In each block diagram, each block does not indicate a hardware unit, but indicates a configuration of a functional unit.

First Example Embodiment

FIG. 1 is a block diagram illustrating an information processing apparatus 2000 according to a first example embodiment. The information processing apparatus 2000 includes an image acquisition unit 2020, an inspection information acquisition unit 2040, and a first display control unit 2060. The image acquisition unit 2020 acquires a captured image containing an inspection target instrument. The inspection information acquisition unit 2040 acquires inspection information regarding the instrument contained in the captured image. The inspection information is information indicating an inspection item of the instrument. For example, the inspection item describes an inspection item the content of which is "confirm whether values of meters on the instrument are within ranges of normal values" and so on. The first display control unit 2060 displays indication representing inspection spots corresponding to inspection items indicated by the inspection information on the display device 10. For example, when the inspection item is an inspection item regarding the values of the above-described meters, the inspection spot is the meter. Here, for example, the first display control unit 2060 displays the indication representing the inspection spots so as to be superimposed on the inspection spots on the display device 10. For example, the first display control unit 2060 displays the indication representing the inspection spots in the inspection spots on the display device 10 or near of the instrument. In the following description, a form in which the indication representing the inspection spots is displayed so as to be superimposed on the inspection spots will be mainly described. An operation of the information processing apparatus 2000 in a form in which the indication representing the inspection spots is displayed near the inspection spots is the same as the information processing apparatus 2000 in a form in which the indication representing the inspection spots is superimposed on the inspection spots.

Figure 2:
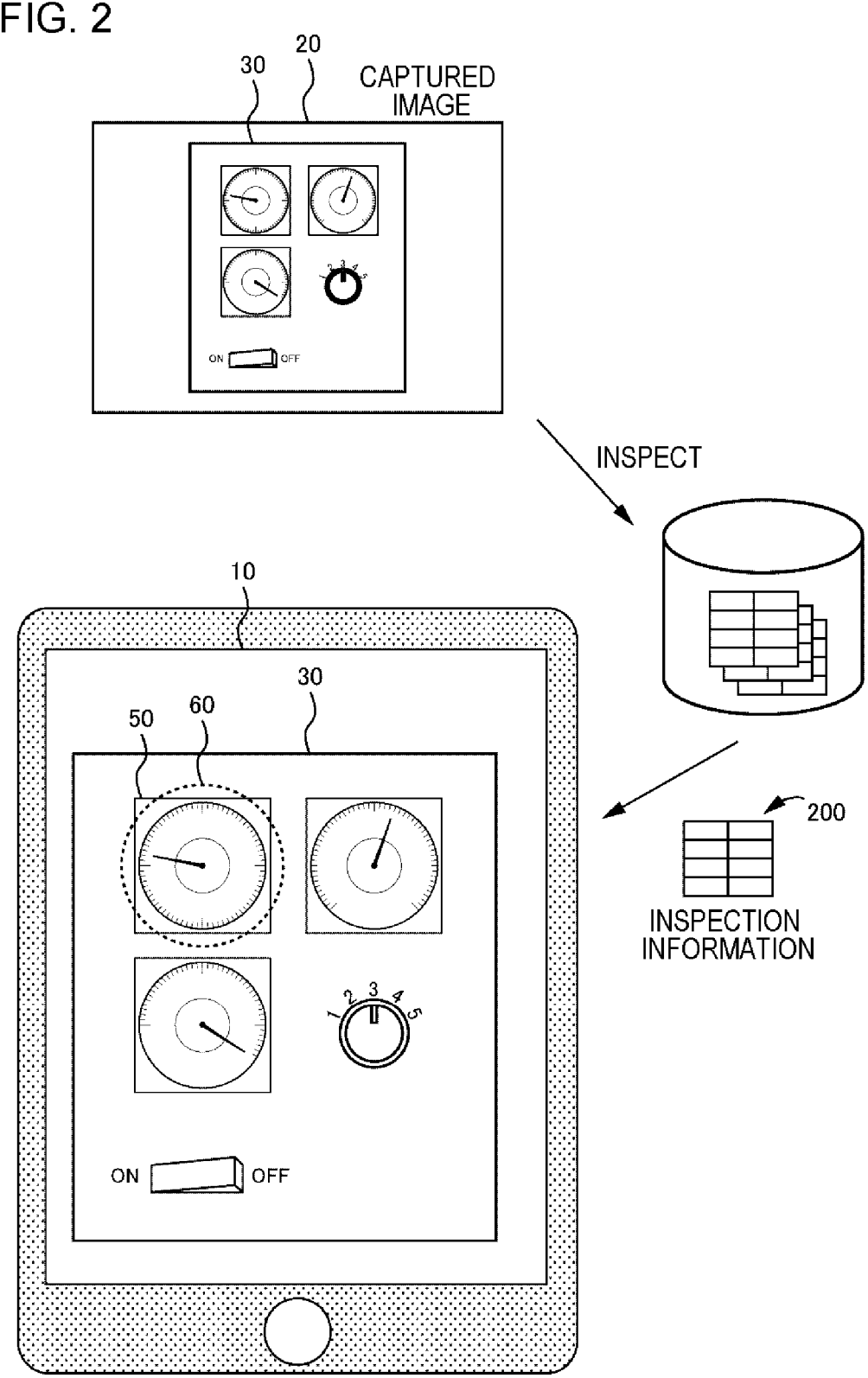
FIG. 2 is a diagram conceptually illustrating an operation of the information processing apparatus according to the first example embodiment.

FIG. 2 is a diagram conceptually illustrating an operation of the information processing apparatus 2000 according to the first example embodiment. In FIG. 2, the information processing apparatus 2000 acquires a captured image 20. Here, the captured image 20 contains an instrument 30. Accordingly, the information processing apparatus 2000 acquires inspection information 200 corresponding to the instrument 30. Then, the information processing apparatus 2000 displays indication 60 representing an inspection spot 50 shown in the inspection information 200 on the display device 10. In FIG. 2, the information processing apparatus 2000 displays the indication 60 so as to be superimposed on the inspection spot 50 in the instrument on the display device.

The above-described example described with reference to FIG. 2 is an example for facilitating the detailed understanding of the information processing apparatus 2000 to be described below and an operation of the information processing apparatus 2000 is not limited to the above-described example. The details or variations of the operation of the information processing apparatus 2000 will be described below.

<Advantageous Effect>

In the information processing apparatus 2000 according to the present example embodiment, the indication 60 representing an inspection spot is displayed in the inspection spot 50 of the instrument 30 on the display device 10. Thus, a user (an inspection worker or the like) can easily ascertain where an inspection target is inspected on the instrument 30. Accordingly, a working burden of an inspection work is reduced.

Hereinafter, the information processing apparatus 2000 according to the present example embodiment will be described in more detail.

<Example of Hardware Configuration of Information Processing Apparatus 2000>

Each functional configuration unit of the information processing apparatus 2000 may be realized by hardware that realizes each functional configuration unit (for example, a hard-wired electronic circuit) or may be realized by a combination of hardware and software (for example, a combination of an electronic circuit and a program controlling the electronic circuit). Hereinafter, a case in which each functional configuration unit of the information processing apparatus 2000 is realized by a combination of hardware and software will be described further.

Figure 3:
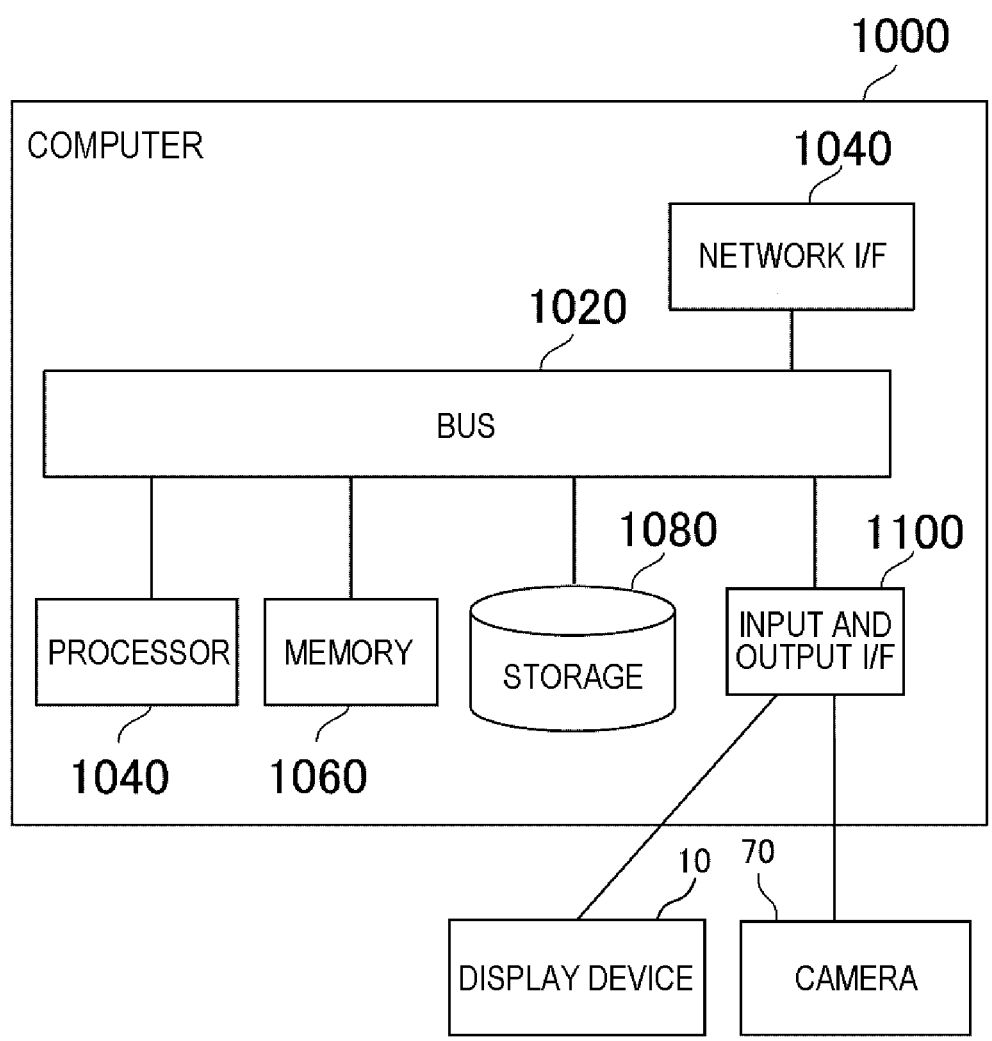
FIG. 3 is a diagram illustrating a configuration of a computer realizing the information processing apparatus.

FIG. 3 is a diagram illustrating a configuration of a computer 1000 realizing the information processing apparatus 2000. The computer 1000 is any of various computers such as a tablet terminal, a smartphone, a personal computer (PC), a server device, and a head-mounted display. The computer 1000 includes a bus 1020, a processor 1040, a memory 1060, a storage 1080, an input and output interface 1100, and a network interface 1120. The bus 1020 is a data transmission path through which the processor 1040, the memory 1060, the storage 1080, and the network interface 1120 transmit and receive data to and from each other. Here, a method of connecting the processor 1040 and the like to each other is not limited to bus connection. The processor 1040 is an arithmetic processing device such as a central processing unit (CPU) or a graphics processing unit (GPU). The memory 1060 is a memory such as a random access memory (RAM) or a read-only memory (ROM). The storage 1080 is a storage device such as a hard disk, a solid-state drive (SSD), or a memory card. The storage 1080 may be a memory such as a RAM or a ROM. The network interface 1120 is an interface with which the computer 1000 communicates with an external device.

The input and output interface 1100 is an interface connecting the computer 1000 to an input and output device. In FIG. 3, the display device 10 and a camera 70 are also connected to the input and output interface 1100. The display device 10 is any display device capable of displaying an image. For example, the display device 10 is a display device of a smartphone or a tablet terminal or a display device of a head-mounted display.

The camera 70 is any camera capable of generating the captured image 20 containing the instrument 30 by imaging the instrument 30. The camera 70 executes imaging repeatedly to generate the captured image 20 indicating each imaging result. The camera 70 may be a 2D camera or 3D camera.

The camera 70 is installed at any location. For example, the camera 70 is a camera that is contained in a smartphone or a tablet terminal. For example, the camera 70 is a camera mounted on an object worn by a user. The object worn by a user is, for example, a head-mounted display or a staff identification card hung around his or her neck. For example, the camera 70 may be installed on a wall or the like of a place in which the instrument 30 is installed. When the camera 70 is installed on the wall or the like, an imaging range (an imaging direction, a zoom magnification, or the like) of the camera 70 can be preferably changed in accordance with a remote operation by a remote controller or the like.

FIG. 4 is a diagram illustrating a tablet terminal 80 including a display device and a camera. The tablet terminal 80 includes a touch panel 82 equivalent to the display device 10 and a camera 84 equivalent to the camera 70. The captured image 20 generated by the camera 84 is displayed on, for example, the touch panel 82.

Figure 5:
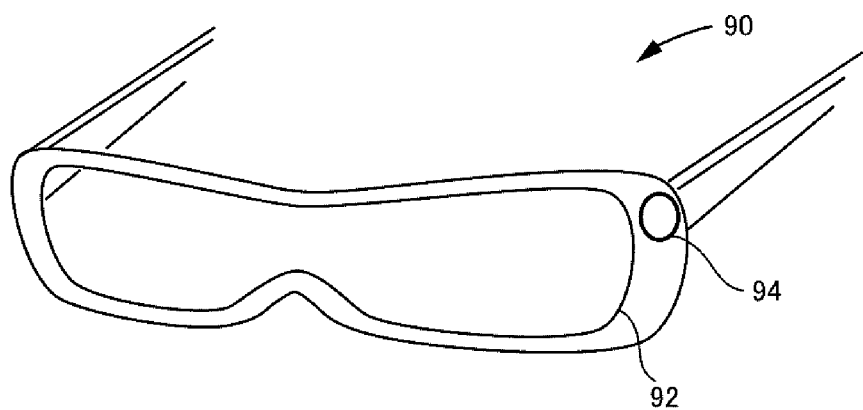
FIG. 5 is a diagram illustrating a head-mounted display including a display device and a camera.

FIG. 5 is a diagram illustrating a head-mounted display 90 including a display device and a camera. The head-mounted display 90 includes a display device 92 equivalent to the above-described display device 10 and a camera 94 equivalent to the camera 70. Here, the display device 92 is a transmissive display device. The user can view an image superimposed on a scenery of the real world when the user views the image displayed on the display device 92 while viewing the scenery of the real world through the display device 92.

In FIG. 5, the camera 94 is installed near the display device 92. Thus, the camera 94 images a visual field direction of the user or a direction close to the sight direction. Therefore, the scenery contained in the captured image 20 generated by the camera 70 is a scenery close to the scenery viewed by the user.

Here, the imaging direction of the camera 94 is any direction and is not limited to the visual field direction or the user or the direction close to the visual field direction. The position at which the camera 94 is installed is not limited to the vicinity of the display device 92. The head-mounted display 90 in which the camera 94 is installed is not limited to the head-mounted display that includes a transmissive display device and may be a head-mounted display that includes a non-transmissive display device. A relation with a type of head-mounted display and a method of implementing the information processing apparatus 2000 will be described below as necessary.

When the touch panel 82 and the camera 84 of the tablet terminal 80 are used as the display device 10 and the camera 70, the computer 1000 may be the tablet terminal 80 or may be a computer other than the tablet terminal 80. In the latter case, the computer 1000 acquires the captured image 20 from the tablet terminal 80 and processes the captured image 20. The computer 1000 instructs the tablet terminal 80 to display the indication 60. The same applies to the case in which the display device 92 and the camera 94 of the head-mounted display 90 are used as the display device 10 and the camera 70.

The storage 1080 stores a program module that realizes each function of the information processing apparatus 2000. The processor 1040 realizes each function corresponding to the program module by executing the program module. Here, when the processor 1040 executes each module, the processor 1040 may read the module on the memory 1060 and executes the module or may execute the module without reading the module on the memory 1060.

The storage 1080 may store inspection information. Here, the inspection information may also be stored in an external device (a database or the like) of the information processing apparatus 2000. When the inspection information is stored in an external device of the information processing apparatus 2000, the information processing apparatus 2000 accesses the external device through a network or the like to acquire the inspection information.

The hardware configuration of the computer 1000 is not limited to the configuration illustrated in FIG. 3. For example, each program module may be stored in the memory 1060.

In this case, the computer 1000 may not include the storage 1080.

<Flow of Process>

Figure 6:
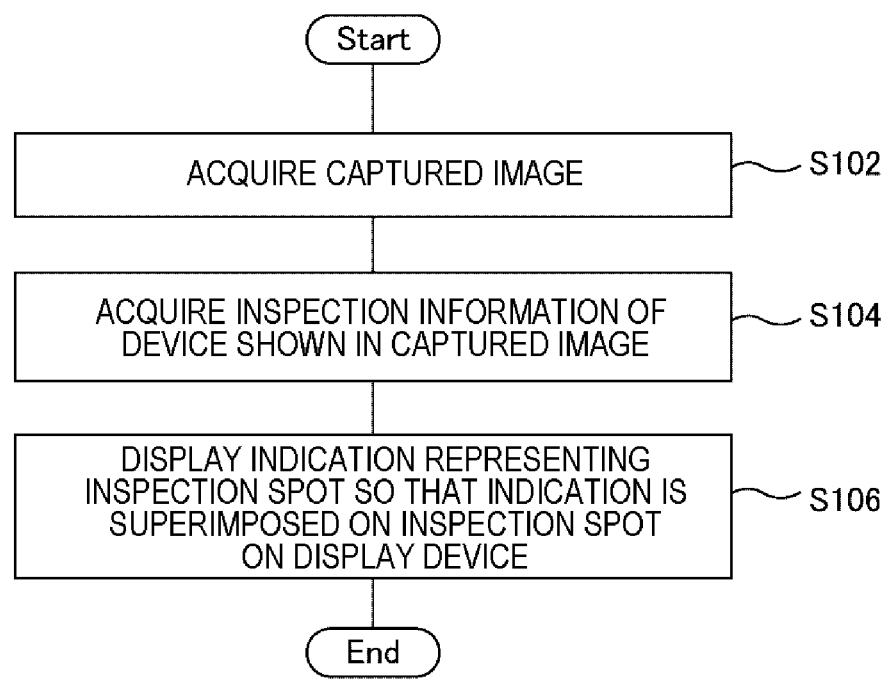
FIG. 6 is a flowchart illustrating a flow of processes executed by the information processing apparatus according to the first example embodiment.

FIG. 6 is a flowchart illustrating a flow of processes executed by the information processing apparatus 2000 according to the first example embodiment. The image acquisition unit 2020 acquires the captured image 20 (S102). The inspection information acquisition unit 2040 acquires the inspection information 200 of the instrument 30 contained in the captured image 20 (S104). The first display control unit 2060 displays the indication 60 representing the inspection spot 50 so that the indication 60 is superimposed on the inspection spot 50 on the display device 10 (S106).

<Details of Image Acquisition Unit 2020>

The image acquisition unit 2020 acquires the captured image 20 generated by the camera 70 (S102). There are various methods in which the image acquisition unit 2020 acquires the captured image 20. For example, the image acquisition unit 2020 acquires the captured image 20 from the camera 70. In this case, the information processing apparatus 2000 and the camera 70 are connected to be communicable.

When the camera 70 stores the captured image 20 in an external storage device, the image acquisition unit 2020 acquires the captured image 20 from the storage device. In this case, the image acquisition unit 2020 is connected to the storage device.

<Details of Inspection Information Acquisition Unit 2040>

The inspection information acquisition unit 2040 acquires the inspection information 200 of the instrument 30 (S104). The inspection information 200 of the instrument 30 indicates one or more inspection items regarding inspection of the instrument 30. The inspection information acquisition unit 2040 acquires the inspection information 200 corresponding to the instrument 30 contained in the captured image 20. Therefore, for example, the inspection information acquisition unit 2040 determines a region containing the instrument 30 in the captured image 20 by executing image analysis on the captured image 20. Then, the inspection information acquisition unit 2040 acquires the inspection information 200 of the instrument 30 based on the region. For example, the inspection information acquisition unit 2040 calculates a feature value of the region containing the instrument 30 and retrieves information in the storage device that stores the inspection information 200 using the feature value. As a result, the inspection information acquisition unit 2040 acquires the inspection information corresponding to the instrument 30 contained in the captured image 20. Here, a known technology can be used for a process of deducing the region containing the instrument 30 in the captured image 20 and a process of calculating a feature value of the region.

FIG. 7 is a diagram illustrating the inspection information 200 in a table format. The inspection information 200 in FIG. 6 includes an inspection item ID 202, an inspection item name 204, inspection content 206, an input format 207, an inspection spot 208, and a display image 210.

The inspection item ID 202 indicates an identifier (ID) of an inspection item. The inspection item name 204 indicates the name of an inspection item. The inspection content 206 indicates content of inspection. For example, "Confirm being within normal value (10 to 15 V)", which is the inspection content 206 of inspection item 0001, indicates an inspection work of "Confirm whether a value of a meter which is an inspection spot is within a range of a normal value equal to or greater than 10 V and equal to or less than 15 V". In addition, "Input setting value", which is the inspection content 206 of inspection item 0006, indicates an inspection work of "Input and record position (setting value) of a lever which is an inspection spot". In addition, "Input ON/OFF", which is the inspection content 206 of inspection item 0007, indicates an inspection work of "Input and record ON/OFF of a switch which is an inspection spot".

The input format 207 indicates the format of an input received from the user. For example, the input format 207 of inspection item 0001 indicates that an input of two choices, OK and NG, is received.

The inspection spot 208 indicates information for determining the position of the inspection spot 50 in the scenery contained in the captured image 20. For example, the inspection spot 208 indicates an appearance feature of the inspection spot 50. Here, a feature value of the appearance of the inspection spot 50 indicated by the inspection spot 208 may be not only the inspection spot 50 but also a feature value of the appearance including the periphery of the inspection spot 50. For example, when the ID of a meter is written near the meter, the inspection spot 208 indicates not only the meter but also a feature value of a range including an ID in the periphery of the meter. For example, the instrument 30 includes the plurality of inspection spots 50 with mutually similar appearances as in three meters installed on the instrument 30 in FIG. 2. Accordingly, by causing the inspection spot 208 to show not only the inspection spot 50 but also the feature value of the range including information such as the IDs of the inspection spots 50 written in the periphery of the inspection spot 50, it is possible to distinguish the plurality of inspection spots 50 with the mutually similar appearances from each other.

For example, the inspection spot 208 indicates a relative position of the inspection spot 50 in the whole instrument 30. For example, the relative position of the inspection spot 50 is represented with XY coordinates in which the upper left end of the instrument 30 is the origin, the right side of the horizontal direction is the X axis, the lower direction of the vertical direction is the Y axis when the front of the instrument 30 is set as a planar view.

Information indicated by the inspection spot 208 is not limited to the feature value of the appearance or the relative position as long as the information is information by which the position of the inspection spot 50 can be determined in the scenery contained in the captured image 20.

The display image 210 indicates an image that is displayed near the inspection spot 50 in conjunction with the indication 60. For example, in the case of inspection item 0001, the first display control unit 2060 displays an image of a balloon indication "Confirm within normal value" and an image of a record indicating the inspection item near the inspection spot 50.

In the inspection information 200 of FIG. 7, a record of inspection item 0000 indicates information regarding the instrument 30. For example, the information regarding the instrument 30 is a feature value of the instrument 30. The record of inspection item 0000 is used when the inspection information acquisition unit 2040 acquires the inspection information 200 corresponding to the instrument 30 contained in the captured image 20. When an image is shown in the display image 210 of inspection item 0000 as in FIG. 7, the first display control unit 2060 may display the image near the instrument 30 on the display device 10.

<Details of First Display Control Unit 2060>

The first display control unit 2060 displays the indication 60 representing the inspection spot 50 so that the indication 60 is superimposed on the inspection spot 50 on the display device 10 (S106). First, the first display control unit 2060 determines the position of the inspection spot 50 in the captured image 20 using the inspection spot 208 indicated by the acquired inspection information 200. For example, when the inspection spot 208 indicates a feature value of the appearance of the inspection spot 50, the first display control unit 2060 determines a region indicating the feature value by executing image analysis on the captured image 20. This region is the position of the inspection spot 50. For example, when the inspection spot 208 indicates the relative position of the inspection spot 50 in the whole instrument 30, the first display control unit 2060 determines the position of the inspection spot 50 in the captured image 20 from the region of the instrument 30 contained in the captured image 20 and the relative position indicated by the inspection spot 208. When there are a plurality of inspection spots with similar appearances on the instrument 30 as in three meters illustrated in FIG. 2, the first display control unit 2060 uses the relative position of the inspection spot 50 on the instrument 30.

Based on the position of the inspection spot 50 on the captured image 20, the first display control unit 2060 displays the indication 60 so that the indication 60 is superimposed on the inspection spot 50 on the display device 10 or the indication 60 is superimposed near the inspection spot 50. Here, an image displayed on the display device 10 by the first display control unit 2060 differs depending on whether 1) the user views the image of the instrument 30 displayed on the display device 10 or 2) the user views the instrument 30 on the real world. Hereinafter, each case will be described.

In the 1) case, the display device 10 is, for example, the touch panel 82 of the tablet terminal 80 or the display device 92 of the non-transmissive head-mounted display 90. In this case, the first display control unit 2060 generates an image in which the indication 60 is superimposed on the inspection spot 50 on the captured image 20 and displays this image on the display device 10.

FIG. 8 are diagrams illustrating a scene in which an image, the indication 60 of which is superimposed on a captured image 20, is displayed on a display device. In FIG. 8A, the image in which the indication 60 is superimposed on the captured image 20 is displayed on the touch panel 82 of the tablet terminal 80. On the other hand, in FIG. 8B, an image in which the indication 60 is superimposed on the captured image 20 is displayed on the display device 92 of the non-transmissive head-mounted display 90.

On the other hand, in the 2) case (when the user views the instrument 30 in the real world), the display device 10 is, for example, the display device 92 of the transmissive head-mounted display 90. In this case, the user can view the instrument 30 of the real world in front of the display device 10. Therefore, the first display control unit 2060 may not necessarily display the captured image 20 on the display device 10 and displays the indication 60 on the display device 10. The first display control unit 2060 displays the indication 60 at an appropriate position of the display device 10. Thus, on the display device 10 viewed from the eyes of the user, the indication 60 is viewed to be superimposed on the inspection spot 50 on the instrument 30 of the real world.

Figure 9:
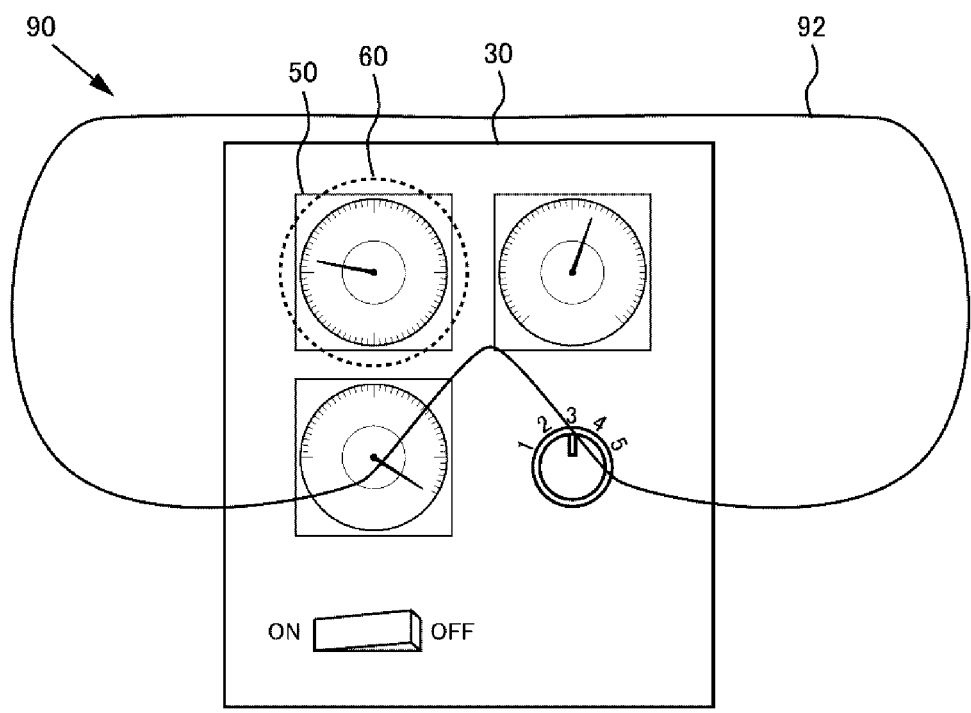
FIG. 9 is a diagram illustrating a scene in which the indication is displayed on the display device.

FIG. 9 is a diagram illustrating a scene in which the indication 60 is displayed on the display device. In FIG. 8, the indication 60 is displayed on the display device 92 of the transmissive head-mounted display 90. The user can view a state in which the indication 60 is superimposed on the inspection spot 50 by simultaneously viewing the indication 60 displayed on the display device 92 and the inspection spot 50 on the instrument 30 viewed in front of the display device 92.

In the case of the transmissive head-mounted display 90, the first display control unit 2060 calculates a position (the above-described "appropriate position") on the display device 92 displaying the indication 60 based on the position of the inspection spot 50 on the captured image 20. Specifically, the first display control unit 2060 calculates the position on the display device 92 displaying the indication 60 by converting the position of the inspection spot 50 on the captured image 20 into a position on the display device 92.

Here, a correspondence relation between the position on the captured image 20 and the position on the display device 92 is determined on the basis of various parameters (an angle of view and a focal distance) of the camera 94 or a positional relation or the like between the display device 92 and the camera 94. The correspondence relation may be calculated using the first display control unit 2060 using such parameters or the like or may be determined in advance as a setting value.

<<Image Used as Indication 60>>

Figure 10:
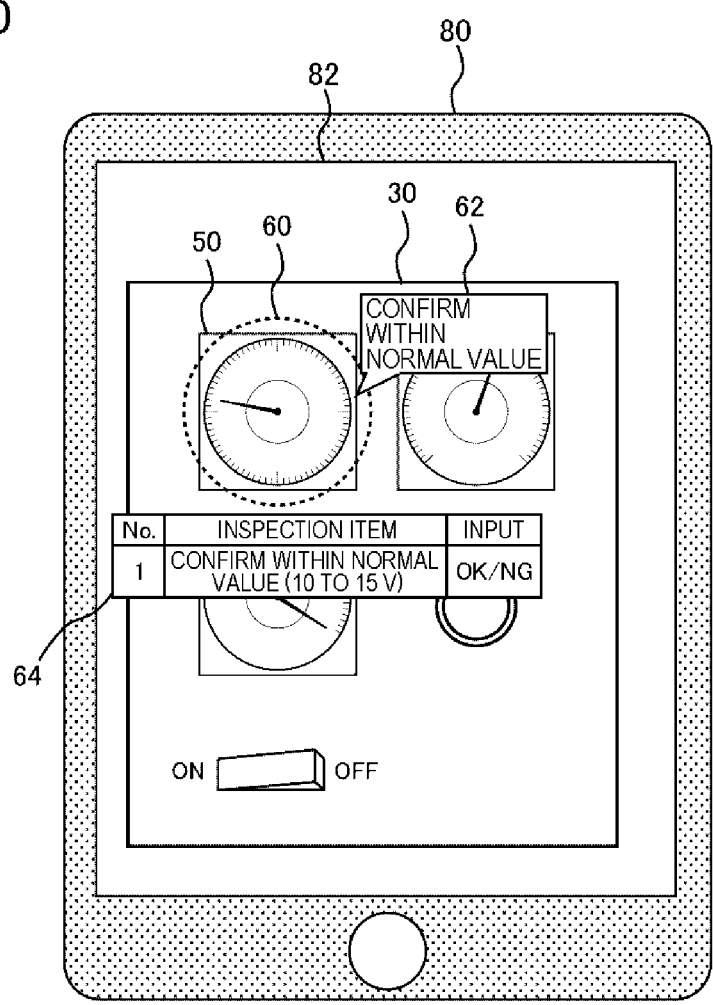
FIG. 10 is a diagram illustrating a scene in which an image shown in a display image is displayed in conjunction with the indication.

Any image is used as the indication 60 by the first display control unit 2060. For example, the first display control unit 2060 uses an image of a figure (a circle, a square, or the like) surrounding a part or the whole of the inspection spot 50 as the indication 60. In this case, as described above, the first display control unit 2060 may display the image indicated in the display image 210 of FIG. 7 near the inspection spot 50 in conjunction with the indication 60 which is a figure such as circle. FIG. 10 is a diagram illustrating a scene in which an image shown in a display image 210 is displayed in conjunction with the indication 60. In FIG. 10, the first display control unit 2060 displays the indication 60, an auxiliary indication 62, and an auxiliary indication 64.

For example, the first display control unit 2060 may use an image indicated in the display image 210 of FIG. 7 as the indication 60 instead of the figure surrounding the inspection spot 50.

<<Change in Indication 60 Accompanied with Progress of Inspection Work>>

When the inspection information 200 indicates a plurality of inspection items, the user of the information processing apparatus 2000 sequentially inspects the plurality of inspection items. Accordingly, the information processing apparatus 2000 sequentially processes the inspection items included in the inspection information 200. Therefore, the first display control unit 2060 gradually changes the indication position or the like of the indication 60 with the progress of the inspection work.

Figure 11:
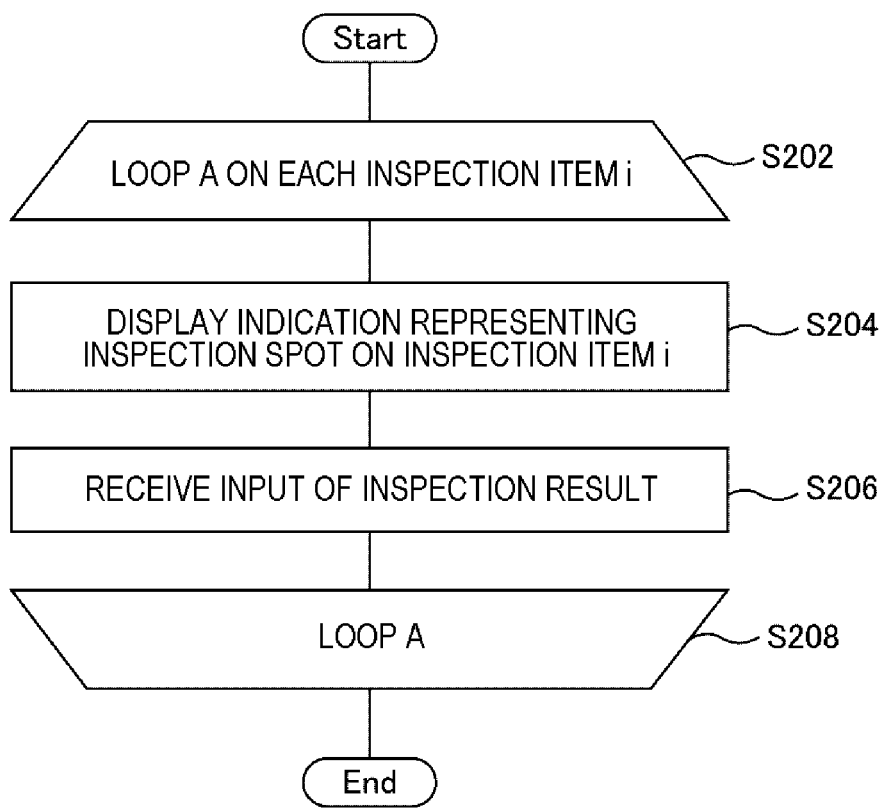
FIG. 11 is a flowchart illustrating a flow of processes in which inspection information including a plurality of inspection items is processed by the information processing apparatus.

FIG. 11 is a flowchart illustrating a flow of processes in which inspection information 200 including a plurality of inspection items is processed by the information processing apparatus 2000. S202 to S208 is a loop process A sequentially executed on each inspection item. In S202, the first display control unit 2060 determines whether the loop process A is executed on all the inspection items indicated by the inspection information 200. When the loop process A has already been executed on all the inspection items, the process of FIG. 11 ends. Conversely, when there is the inspection item which has not been a target of the loop process A yet, the first display control unit 2060 acquires a subsequent inspection item. Here, a subsequent inspection item is written as an inspection item i.

The first display control unit 2060 displays the indication 60 representing the inspection spot 50 corresponding to the inspection item i on the display device 10 (S204). The information processing apparatus 2000 receives an input of the inspection result for the inspection item i from the user (S206). S208 is a termination of the loop process A. Accordingly, the process of FIG. 11 proceeds from S208 to S202.

Any method in which the first display control unit 2060 selects the inspection item i from the plurality of inspection items in S202 can be used. For example, the first display control unit 2060 selects the inspection item i at random from the inspection items which are not yet the target of the loop process A. For example, the first display control unit 2060 selects the inspection item in a sequence determined in advance in the inspection information 200. The order of the inspection items determined in advance in the inspection information 200 is, for example, an ascending order of the inspection item ID 202.

Further, the first display control unit 2060 may select an inspection item at which the user looks as the inspection item i. Specifically, the first display control unit 2060 calculates the position of the inspection spot corresponding to the inspection item which is not yet the target of the loop process A on the captured image 20. The captured image 20 used here is, for example, the captured image 20 the imaging time point of which is the latest (the newest). Then, the first display control unit 2060 determines the inspection spot that has a shortest distance to a reference position (for example, a central position of the captured image 20) on the captured image 20 among the inspection spots. Then, the first display control unit 2060 selects the inspection item corresponding to the determined inspection spot as the inspection item i.

When there are a plurality of inspection items corresponding to the determined inspection spot, for example, as the inspection item i, the first display control unit 2060 selects the inspection item selected at random from the inspection items, or the inspection item the order determined in advance of which is the fastest.

In this way, the user can view the inspection spot 50 without changing his or her sight direction as much as possible. Accordingly, it is possible to further reduce a labor necessary for the user to execute the inspection work.

<Method of Receiving Input>

There are various methods in which the information processing apparatus 2000 receives an input from the user. For example, the information processing apparatus 2000 may receive a key input using a keyboard or a touch panel or may receive a voice input using a microphone. The information processing apparatus 2000 may receive a gesture input by imaging a gesture of the user using the camera 70. Other input methods will be described in the following example embodiments.

Second Example Embodiment

Figure 12:
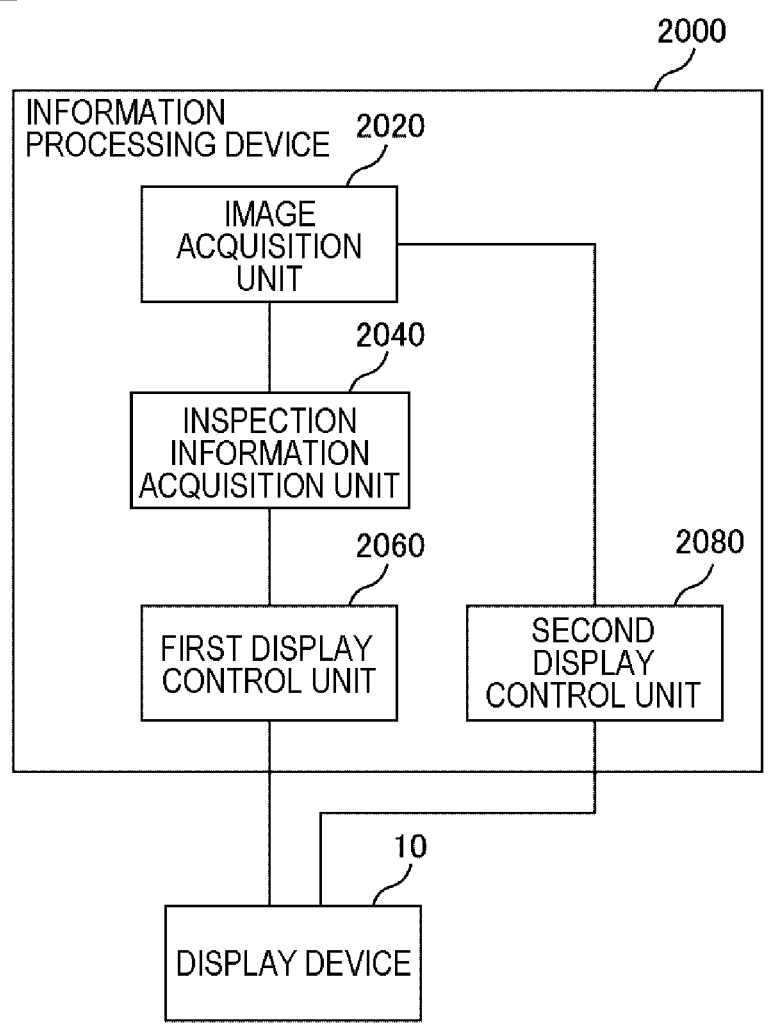
FIG. 12 is a block diagram illustrating an information processing apparatus according to a second example embodiment.

FIG. 12 is a block diagram illustrating an information processing apparatus 2000 according to a second example embodiment. The information processing apparatus 2000 according to the second example embodiment further includes a second display control unit 2080. The second display control unit 2080 displays an image of an input interface (hereinafter referred to as an interface image) to the display device 10. The information processing apparatus 2000 receives an input by a user by recognizing an operation on the interface image.

Figure 13:
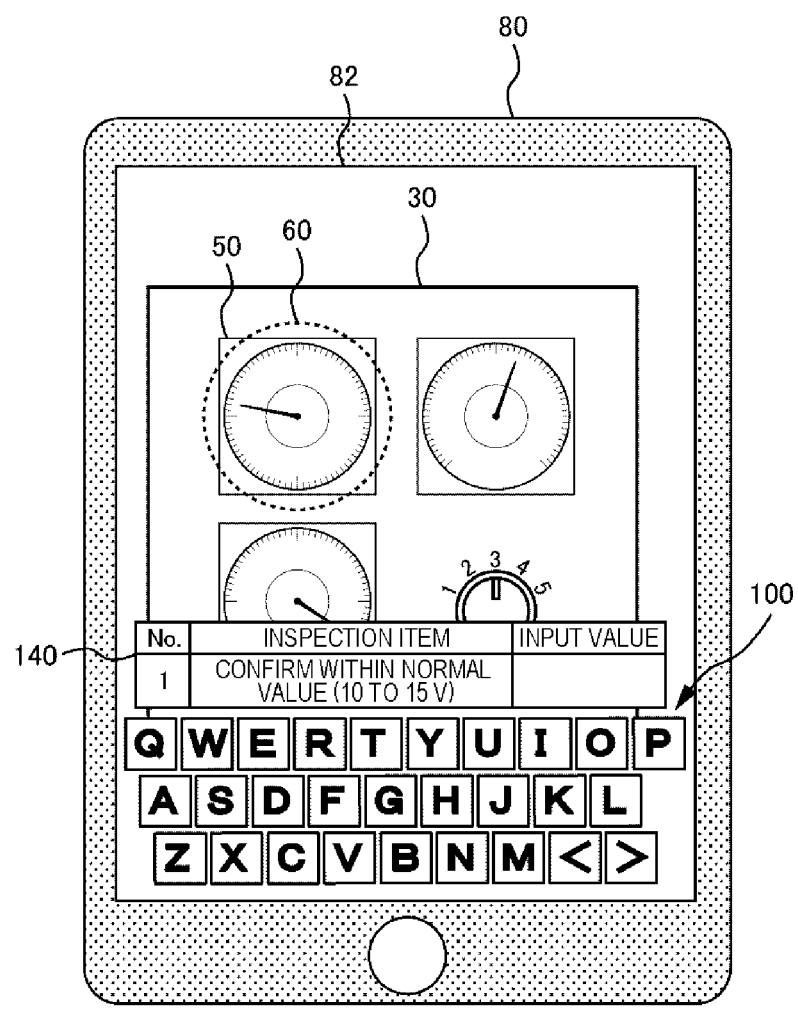
FIG. 13 is a diagram illustrating a scene in which an interface image is displayed on a touch panel of a tablet terminal.

FIG. 13 is a diagram illustrating a scene in which an interface image is displayed on a touch panel 82 of a tablet terminal 80. In FIG. 13, the interface image is a keyboard image 100 representing a keyboard. The user inputs text or the like by touching the keyboard image 100 displayed on the touch panel 82. The input by the user is displayed in an input field 140. Here, a known technology can be used for a method of displaying the interface image such as the keyboard image 100 or the like on the touch panel 82 of the tablet terminal 80 and a method of receiving an input on the interface image by the tablet terminal 80.

Figure 14:
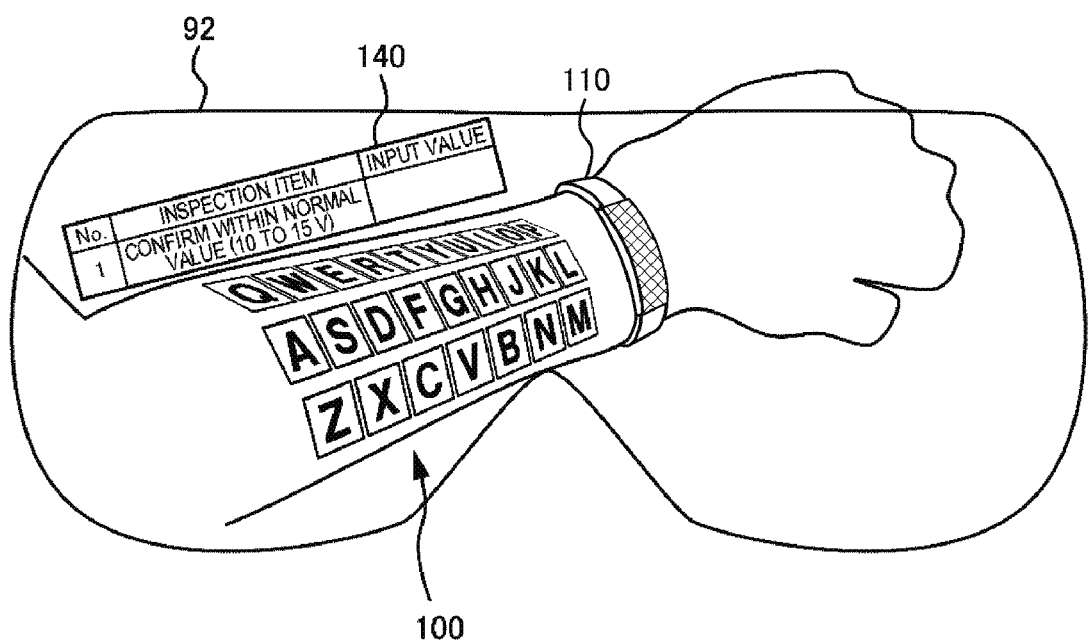
FIG. 14 is a diagram illustrating a scene in which a keyboard image is displayed on a display device of a head-mounted display.

FIG. 14 is a diagram illustrating a scene in which a keyboard image 100 is displayed on the display device 92 of the head-mounted display 90. The user executes an input by operating the keyboard image 100. For example, the head-mounted display 90 detects that the interface image is operated by detecting vibration added to a location (the left arm of the user in FIG. 14) in which the keyboard image 100 is displayed.

In FIG. 14, a watch type device 110 is worn on the user. A vibration sensor is contained in the device 110. When the user taps the left arm, the vibration sensor contained in the device 110 detects vibration generated by the tapping. The device 110 notifies the head-mounted display 90 of the detection of the vibration. The head-mounted display 90 recognizes that the vibration is applied to the left arm of the user, by receiving this notification.

Further, the head-mounted display 90 determines which portion of the interface image a finger of the user overlaps in the captured image 20 by executing image analysis on the captured image 20 generated at a timing at which the vibration is applied to the left arm of the user. Then, the head-mounted display 90 determines that the overlapping portion is a portion operated by the user. For example, the head-mounted display 90 calculates the position of the finger of the user on the captured image 20 generated at the timing at which the vibration is detected. Then, the head-mounted display 90 determines which key of the interface image the finger of the user overlaps based on the position of the interface image displayed on the display device 92 and the position of the finger of the user on the captured image 20. For example, when the position of the finger of the user is a position overlapping a key A, the head-mounted display 90 determines the key A is pressed. As described above, a correspondent relation between the position on the captured image 20 and the position on the display device 92 is determined on the basis of various parameters of the camera 94 or a positional relation between the display device 92 and the camera 94.

Here, in order to determine which button (a key or the like) the user presses, it is necessary for the head-mounted display 90 to recognize where each button is installed on the interface image. Therefore, for example, the head-mounted display 90 acquires information regarding the interface image (hereinafter referred to as interface information) in regard to the interface image displayed by the second display control unit 2080.

Figure 15:
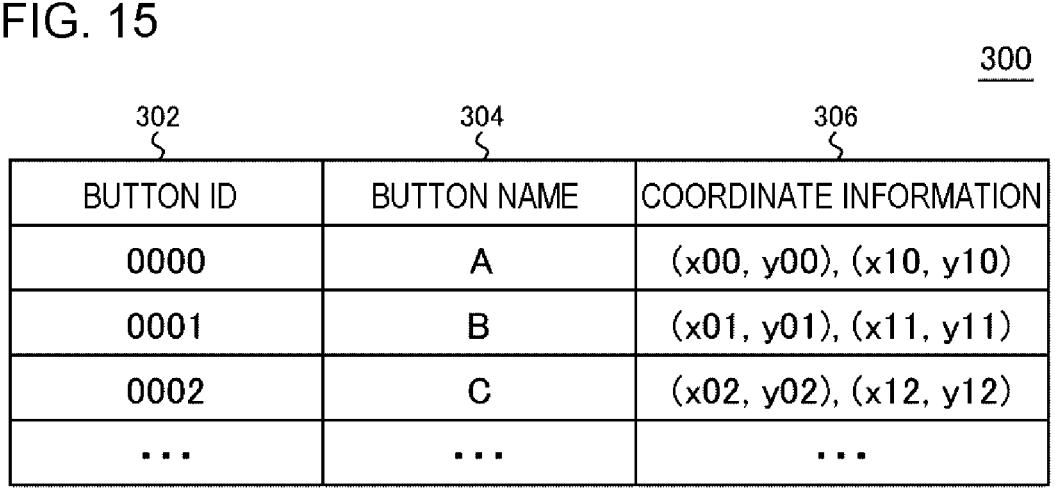
FIG. 15 is a diagram illustrating interface information in a table format.

FIG. 15 is a diagram illustrating interface information in a table format. Interface information 300 of FIG. 15 includes a button ID 302, a button name 304, and coordinate information 306. The button ID 302 indicates an ID of a button. The button name 304 indicates the name of the button. The coordinate information 306 indicates the position of the button (a region occupied by the button) on the interface image. For example, the coordinate information 306 is represented using coordinates the origin of which is the upper left end of the interface image. In FIG. 15, the coordinate information 306 represents the coordinates of the upper left end and the lower right end of the region of the button, with the upper left end of the interface image as the origin.

For example, the information processing apparatus 2000 calculates the position of the finger of the user on the interface image based on the position of the interface image on the display device 10 and the position of the finger of the user on the captured image 20. Then, the information processing apparatus 2000 determines a button (a pressed button) corresponding to the position of the finger of the user based on the calculated position and the coordinate information 306 of each button.

The above-described method of detecting the input using the vibration sensor is merely an example and the vibration sensor is not an essential constituent element. For example, when the finger of the user overlaps the same key for a predetermined time, the head-mounted display 90 may detect that the key is operated.

<Displayed Interface Image>

The interface image displayed on the display device 10 may be one image which is determined in advance or may be an image which can be changed through selection by the user. In the former case, for example, the interface image is set in advance in the second display control unit 2080. For example, information indicating the interface image displayed on the display device 10 is stored in a storage device which can be accessed by the second display control unit 2080.

Figure 16A:
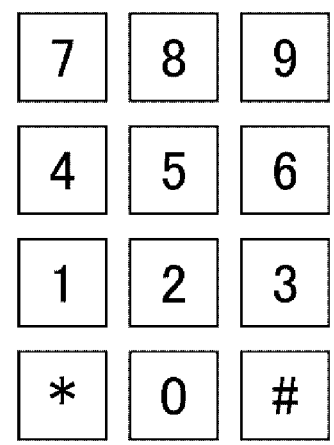
FIG. 16 are diagrams illustrating an interface image other than a keyboard image.
Figure 16B:
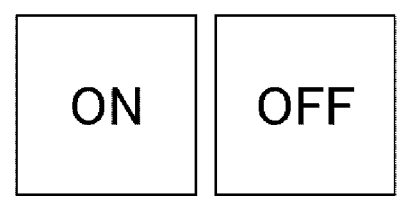

On the other hand, when the interface image can be changed through selection by the user, for example, the second display control unit 2080 first displays a default interface image on the display device 10. At this time, an image of a key for selecting another interface image is contained in the interface image. The user changes the interface image by operating this key. FIG. 16 are diagrams illustrating an interface image other than the keyboard image 100. FIG. 16A exemplifies an interface image representing a numeric key. FIG. 16B exemplifies an interface image representing options of ON/OFF.

The interface image may differ in accordance with the inspection spot 50. For example, when an inspection work on the inspection spot 50 includes an input of any number, the interface image is an image of a numeric key (see FIG. 16A) or the like. For example, when the inspection work on the inspection spot 50 includes an input of selecting one of the plurality of options, the interface image is the interface image (see FIG. 16B) indicating the option. In the inspection spot 50 accompanying the selection of the option, for example, there is a switch that takes an ON or OFF state.

When the interface image differs in accordance with the inspection spot 50, each item of the inspection information 200 indicates an ID or a type of interface image corresponding to the inspection spot 50 of the item. The ID of the interface image is, for example, a file name of the interface image. The type of the interface image is a keyboard, a numeric key, or the like.

FIG. 17 is a diagram illustrating inspection information 200 indicating IDs and types of interface images. The inspection information 200 illustrated in FIG. 17 further includes an interface image 212 in addition to the columns included in the inspection information 200 illustrated in FIG. 7. Here, to easily illustrate the drawing, the content of the display image 210 is not illustrated in the inspection information 200 illustrated in FIG. 17.

The interface image 212 indicates the ID or the type of the interface image. For example, the interface image 212 of item 0001 indicates an ID (file name) of the interface image, "if001.png". On the other hand, the interface image 212 of item 0006 indicates a type of an interface image, "numeric key".

When the ID of the interface image is indicated in the inspection information 200, the second display control unit 2080 acquires the interface image with the ID and displays the acquired interface image on the display device 10. On the other hand, when the type of interface image is indicated in the inspection information 200, the second display control unit 2080 acquires this type of interface image and displays the acquired interface image on the display device 10.

Here, the interface image may be stored inside the information processing apparatus 2000 or in an external storage device or may be included in the inspection information 200.

Figure 18:
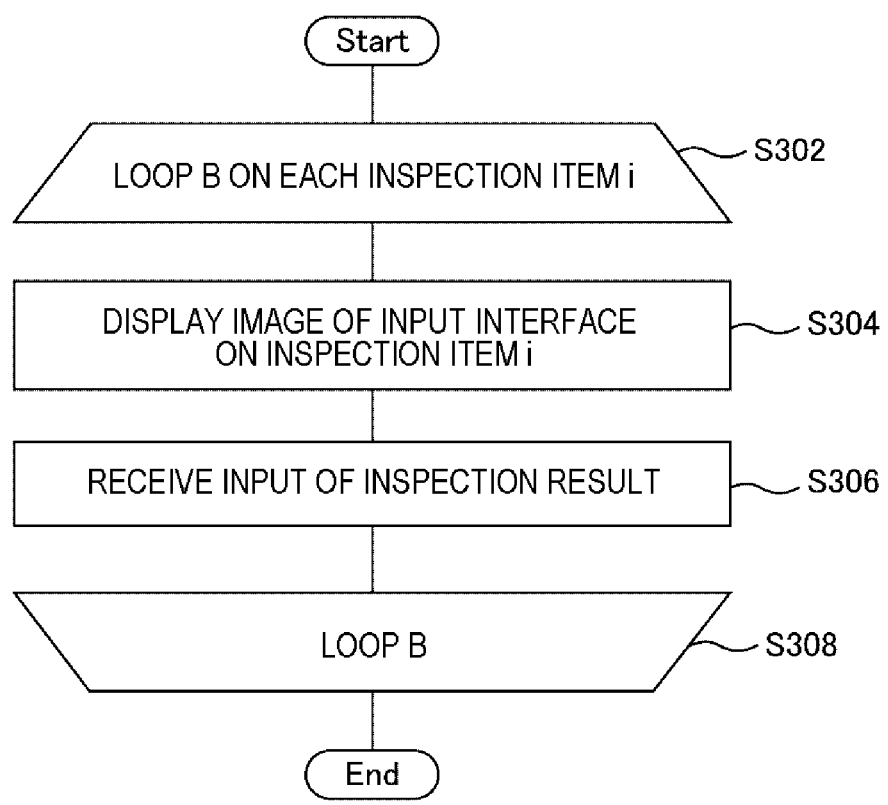
FIG. 18 is a flowchart illustrating a flow of processes of a second display control unit when an interface image is associated with an inspection item.

FIG. 18 is a flowchart illustrating a flow of processes of the second display control unit 2080 when an interface image is associated with an inspection item. S302 to S308 is a loop process B sequentially executed on each inspection item. In S302, the second display control unit 2080 determines whether the loop process B is executed on all the inspection items indicated by the inspection information 200. When the loop process B has already been executed on all the inspection items, the process of FIG. 18 ends. Conversely, when there is the inspection item which has not been a target of the loop process B yet, the second display control unit 2080 acquires a subsequent inspection item. Here, a subsequent inspection item is written as an inspection item i.

The second display control unit 2080 displays the interface image corresponding to the inspection item i on the display device 10 (S304). The information processing apparatus 2000 receives an input of the inspection result for the inspection item i from the user (S306). S308 is a termination of the loop process B. Accordingly, the process of FIG. 18 proceeds from S308 to S302.

A method in which the second display control unit 2080 selects the inspection item i from the plurality of inspection items in S302 is the same as the method in which the first display control unit 2060 selects the inspection item i from the plurality of inspection items in S202, as described in the first example embodiment.

<Timing at Which Interface Image Is Displayed>

There are various timings at which the second display control unit 2080 displays the interface image. For example, the second display control unit 2080 displays the interface image on the display device 10 at the same timing as or a timing close to the timing at which the first display control unit 2060 displays the indication 60 on the display device 10.

Figure 19:
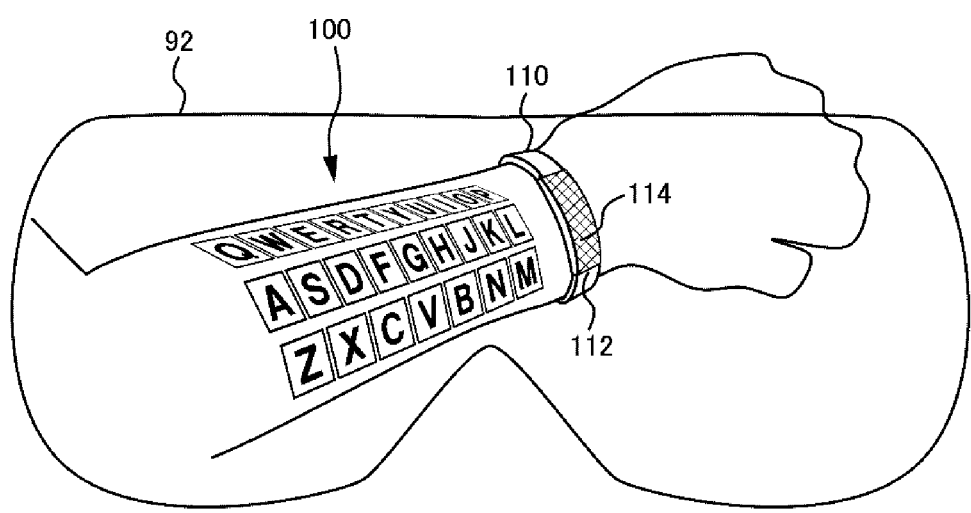
FIG. 19 is a diagram illustrating a scene in which a marker is included in a captured image.

For example, the second display control unit 2080 may display the interface image on the display device 10 at a timing at which a marker serving as a sign for displaying the interface image is contained in the captured image 20 (at a timing at which the marker is imaged by the camera). FIG. 19 is a diagram illustrating a scene in which a marker is included in a captured image 20. In FIG. 19, the marker is a marker image 114 displayed on the touch panel 112 of the watch type device 110 worn around an arm of the user. The second display control unit 2080 repeatedly executes image analysis on the captured image 20 generated by the camera. When it is detected that the marker image 114 is contained in the captured image 20, the second display control unit 2080 displays the interface image (the keyboard image 100 in FIG. 19).

Here, the image used as the marker is not limited to the above-described marker image 114. The marker may be any sign (text, a figure, or a symbol) which can be detected through the image analysis. For example, the marker is a predetermined sign which can be directly drawn on an arm or the like of the user. For example, the marker is a predetermined sign drawn on any object worn on an arm or the like of the user. The object worn on the arm of the user is, for example, a ring worn on a finger of the user, a wristband worn on a wrist of the user, or a sleeve of a cloth worn by the user. For example, the marker is printed on a sleeve of a work cloth commonly worn by a worker executing an inspection work. The marker may be drawn or printed on a hand.

Information for determining a sign recognized as the marker may be set in advance in the second display control unit 2080 or may be stored in a storage device which can be accessed by the second display control unit 2080.

Figure 20:
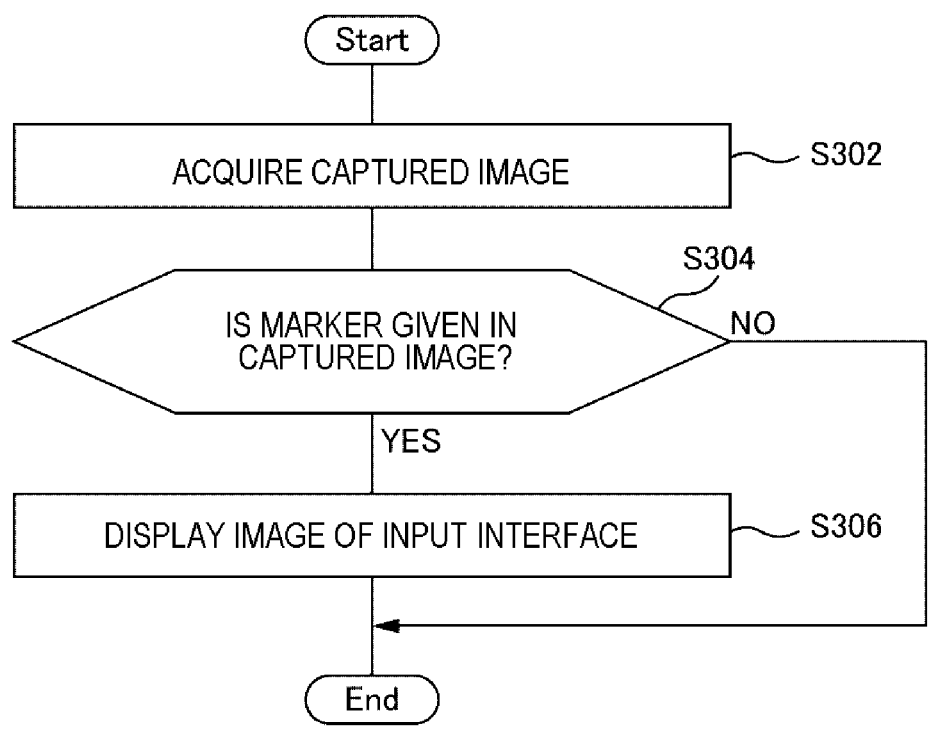
FIG. 20 is a flowchart illustrating a process of displaying an image of an input interface using a marker.

FIG. 20 is a flowchart illustrating a process of displaying an image of an input interface using a marker. The image acquisition unit 2020 acquires the captured image 20 (S402). The second display control unit 2080 determines whether the marker is contained in the captured image 20 (S404). When the marker is contained in the captured image 20 (YES in S404), the second display control unit 2080 displays the image of the input interface on the display device 10 (S406). Conversely, when the marker is not contained in the captured image 20 (NO in S404), the process of FIG. 20 ends.

<Display Position of Interface Image>

There are various positions at which the second display control unit 2080 displays the interface image. For example, the second display control unit 2080 displays the interface image at a predetermined position of the display device 10. For example, the predetermined position is one of four corners of the display device 10. Information indicating the predetermined position may be set in advance in the second display control unit 2080 or may be stored in a storage device which can be accessed by the second display control unit 2080.

For example, the second display control unit 2080 may determine the display position of the interface image based on the position of the above-described marker. Specifically, the display position of the interface image is defined in advance as a relative position to the position of the marker. The second display control unit 2080 calculates the position of the interface image on the captured image 20 from the position of the marker contained in the captured image 20. Then, the second display control unit 2080 displays the captured image 20 on which the interface image is superimposed at the calculated position on the display device 10.

As described above, when the captured image 20 is not displayed on the display device 10 (for example, the transmissive head-mounted display 90 is used), the second display control unit 2080 converts the position of the interface image on the captured image 20 into a position on the display device 10. Then, the second display control unit 2080 displays the interface image at the position on the display device 10 calculated through the conversion.

<Advantageous Effect>

According to the information processing apparatus 2000 of the present example embodiment, the user can input the inspection result using the information processing apparatus 2000. Therefore, an input work of the inspection result is more easily executed by the user than, for example, when the inspection result has to be written on a paper such as a note. In particular, when the ID or type of interface image is determined in accordance with the inspection item, the user can more easily confirm the input result in accordance with the inspection item. This is because the interface image in accordance with the inspection item is automatically displayed on the display device 10.

Third Example Embodiment

Figure 21:
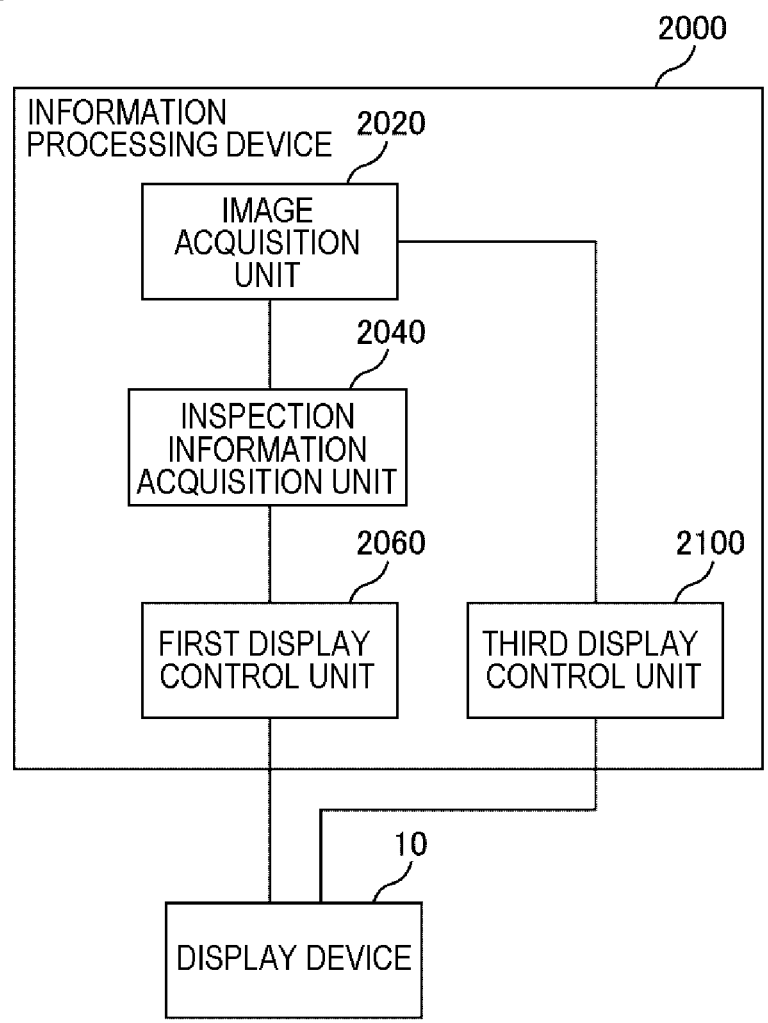
FIG. 21 is a block diagram illustrating an information processing apparatus according to a third example embodiment.

FIG. 21 is a block diagram illustrating an information processing apparatus 2000 according to a third example embodiment. Except for the following description, the information processing apparatus 2000 according to the third example embodiment have the same functions as the information processing apparatus 2000 according to the first or second example embodiment and a combination thereof.

According to the third example embodiment, the information processing apparatus 2000 further includes a third display control unit 2100. The third display control unit 2100 displays an image of the instrument 30 and the indication 60 on the display device 10, when acquiring the captured image 20 in which the instrument 30 is not contained. Thus, the user can view the instrument 30 and recognizes the inspection spot when the instrument 30 is not within her view.

Figure 22:
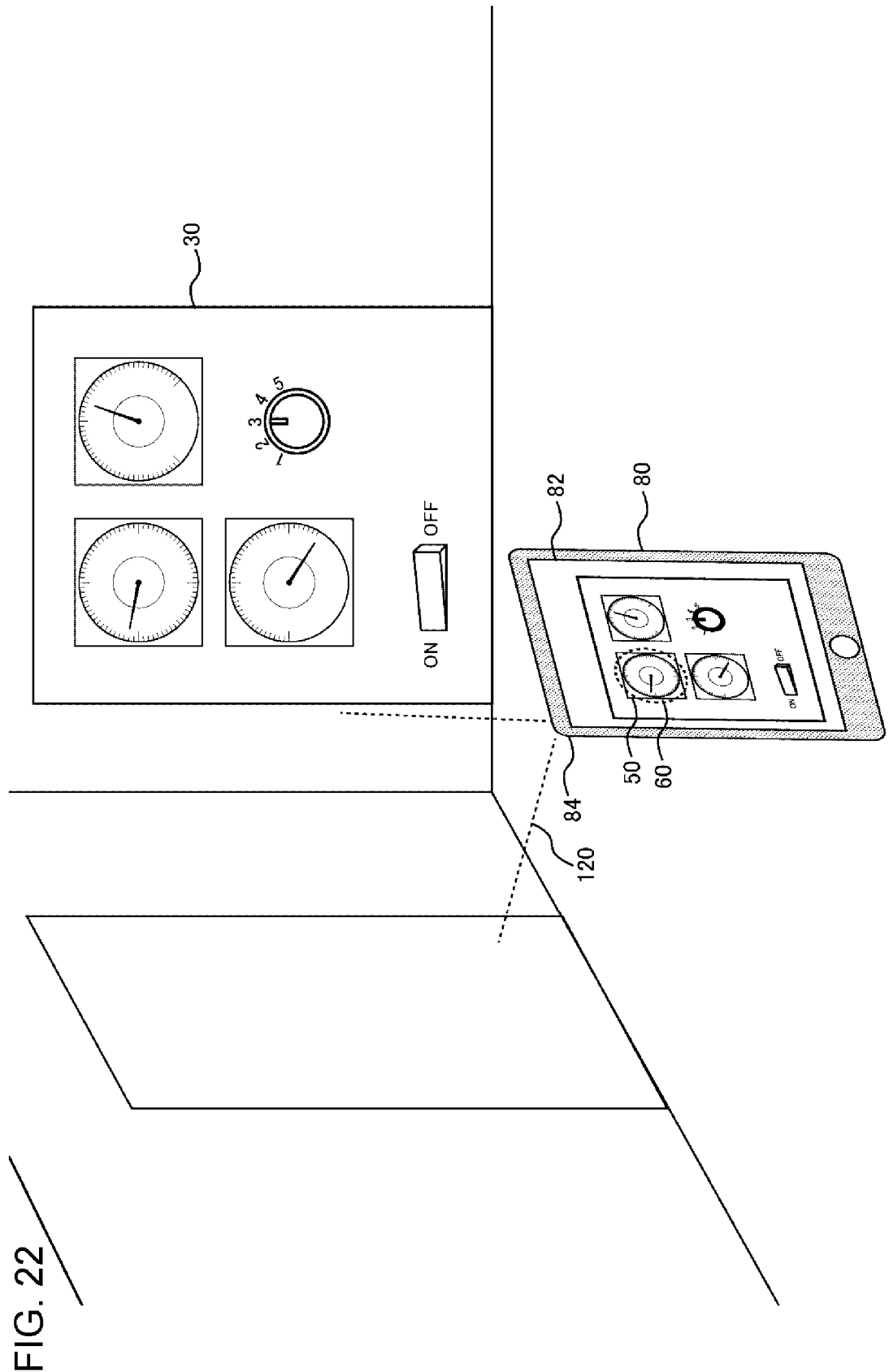
FIG. 22 is a diagram illustrating a scene in which an image of an instrument is displayed on a touch panel of a tablet terminal.

FIG. 22 is a diagram illustrating a scene in which an image of an instrument 30 is displayed on a touch panel 82 of a tablet terminal 80. In FIG. 22, an imaging range 120 is an imaging range of the camera 84. As illustrated, the instrument 30 in the real world is out of the imaging range of the camera 84. Accordingly, the instrument 30 is not contained in the captured image 20. Thus, the third display control unit 2100 displays an image of the instrument 30 on the touch panel 82. The indication 60 is displayed so as to be superimposed on the inspection spot 50 on the image of the instrument 30 that is displayed on the touch panel 82. The user can recognize the current inspection spot by viewing the indication 60 and the instrument 30 displayed on the touch panel 82. The same applies to a case in which the display device 10 is the display device 92 of the head-mounted display 90.

Here, as described above, when the transmissive head-mounted display 90 is used, the user views the instrument 30 in the real world rather than viewing the instrument 30 contained in the captured image 20. However, even in this case, when the position, the angle of view, and the like of the camera 94 are set so that the imaging direction of the camera 94 and a sight direction of the user are identical or approximate to each other, the instrument 30 is not within the view of the user when the instrument 30 is not contained in the captured image 20. Accordingly, the third display control unit 2100 can indirectly recognize whether the instrument 30 is within the view of the user by determining whether the instrument 30 is contained in the captured image 20. Accordingly, by displaying the image of the instrument 30 on the display device 92 when the instrument 30 is not contained in the captured image 20, the user can view the image of the instrument 30 instead of the instrument 30 in the real world in a case in which the instrument 30 is out of the visual field.

<Method of Displaying Image of Instrument 30>

The third display control unit 2100 acquires the image of the instrument 30 displayed on the display device 10. Here, there are various methods in which the third display control unit 2100 acquires the image of the instrument 30. For example, the third display control unit 2100 acquires the entire captured image 20 containing the instrument 30 or a region containing the instrument 30 in the captured image 20 as the image of the instrument 30. For example, when the inspection information 200 contains the image of the instrument as in the inspection information 200 of FIG. 7, the third display control unit 2100 may acquire the image of the instrument 30 contained in the inspection information 200.

Any position on the display device 10 at which the image of the instrument 30 is displayed can be used. For example, the third display control unit 2100 displays the image of the instrument 30 at a predetermined position (one of four corners) on the display device 10. Information indicating the predetermined position may be set in advance in the third display control unit 2100 or may be stored in a storage device which can be accessed by the third display control unit 2100.

For example, the third display control unit 2100 may display the image of the instrument 30 at a position that is determined by using the marker described in the second example embodiment as a reference. In this case, when the marker is contained in the captured image 20, the third display control unit 2100 displays the image of the instrument 30. The method in which the third display control unit 2100 displays the image of the instrument 30 at the position based on the position of the marker is the same as the method in which the second display control unit 2080 displays the interface image at the position based on the position of the marker.

<Change in Indication 60>

When the user input the inspection result in a state in which the image of the instrument 30 is displayed on the display device 10, the third display control unit 2100 changes the indication position or the like of the indication 60 on the image of the instrument 30 to a position corresponding to a subsequent inspection item. By doing so, the user can recognize the subsequent inspection spot 50 even when the user input the inspection result in a state in which the instrument 30 is not contained in the captured image 20. Accordingly, the user can easily look at the inspection spot 50 to be viewed subsequently.

Figure 23B:
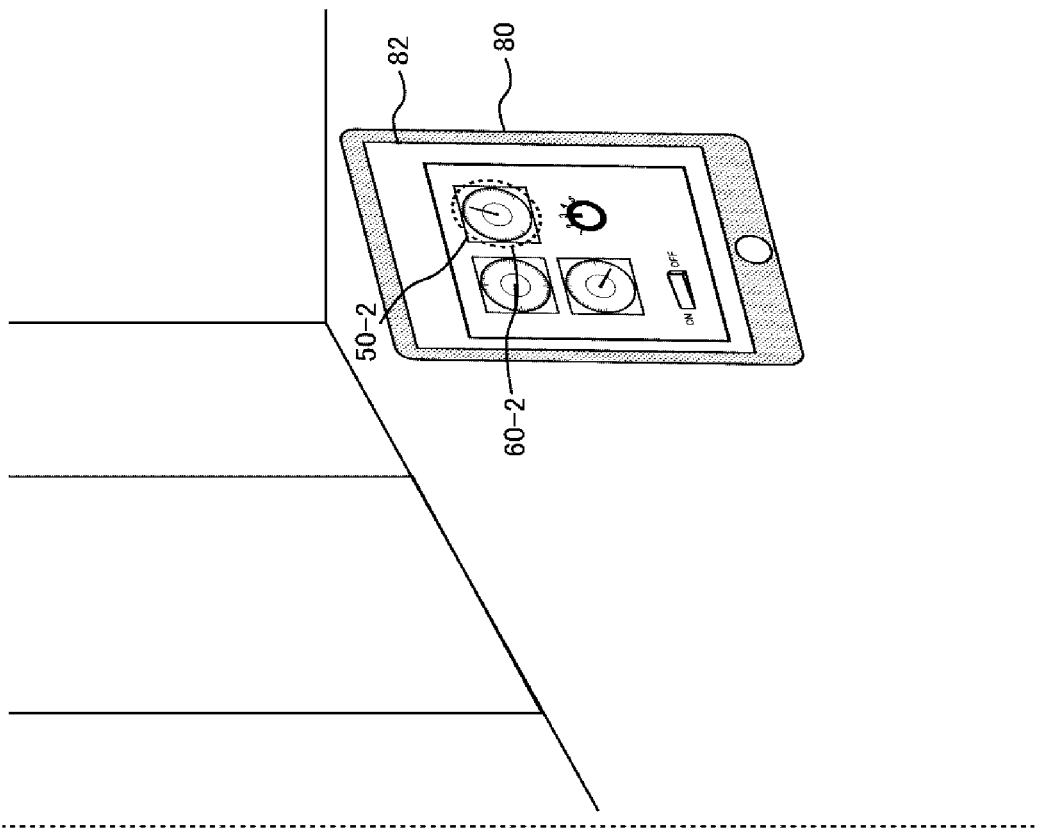
FIG. 23 are diagrams illustrating a scene in which an inspection result is input in a state in which an image of an instrument is displayed on the touch panel.
Figure 23A:
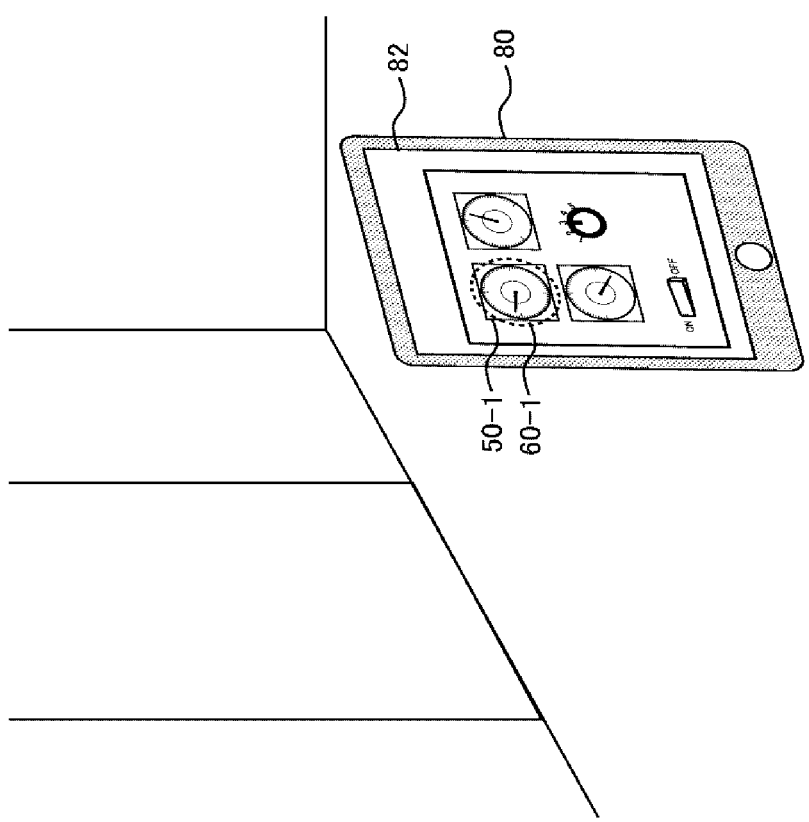

FIG. 23 are diagrams illustrating a scene in which an inspection result is input in a state in which an image of the instrument 30 is displayed on the touch panel 82. FIG. 23A illustrates a scene before an inspection result of an inspection spot 50-1 is input and FIG. 23B illustrates a scene after the inspection result of the inspection spot 50-1 is input. In FIG. 23A, an indication 60-1 is superimposed on the inspection spot 50-1. On the other hand, in FIG. 23B, an indication 60-2 is superimposed on an inspection spot 50-2 which is a subsequent inspection spot of the inspection spot 50-1.

<Condition for Displaying Image of Instrument 30>

In the above description, the third display control unit 2100 displays the image of the instrument 30 when "the instrument 30 is not contained in the captured image 20". However, the case in which the third display control unit 2100 displays the image of the instrument 30 is not limited to the case in which the instrument 30 is not completely contained in the captured image 20. For example, the third display control unit 2100 displays the image of the instrument 30 when the ratio of the size of the instrument 30 contained in the captured image 20 to the size of the entire instrument 30 is equal to or less than a predetermined ratio. For example, when the instrument 30 is contained in the captured image 20 and the current inspection spot 50 is not contained in the indication 60, the third display control unit 2100 displays the image of the instrument 30. For example, when the marker is contained in the captured image 20, the third display control unit 2100 displays the image of the instrument 30 irrespective of whether the instrument 30 is not contained in the captured image 20.

Fourth Example Embodiment

Figure 24:
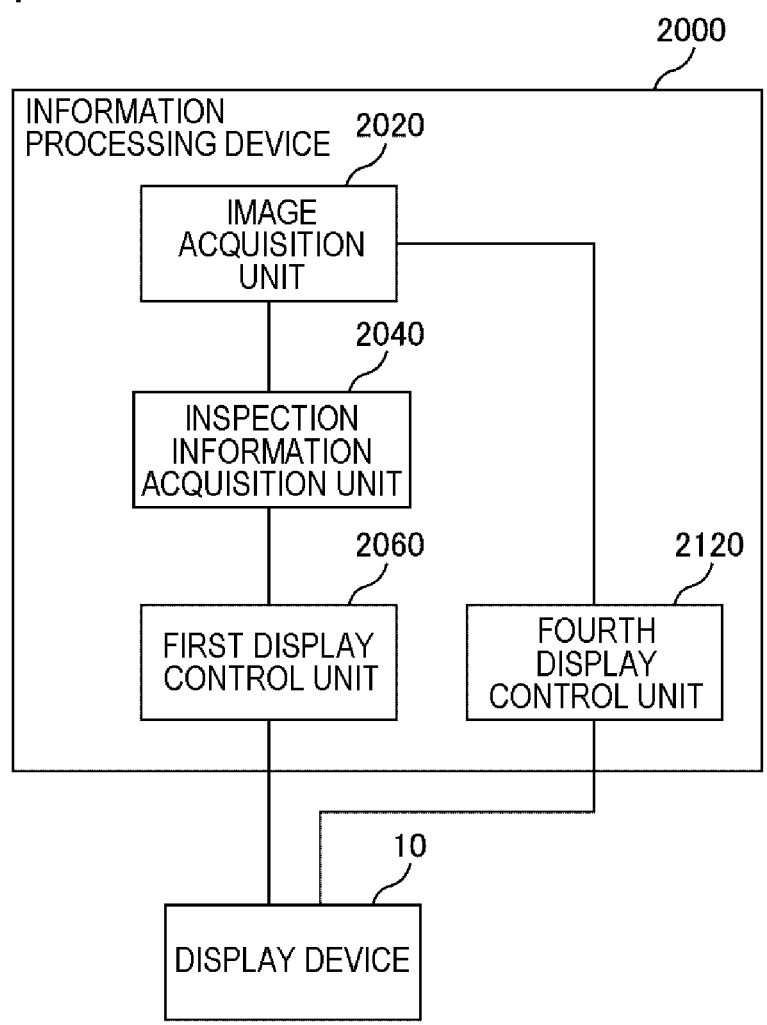
FIG. 24 is a block diagram illustrating an information processing apparatus according to a fourth example embodiment.

FIG. 24 is a block diagram illustrating an information processing apparatus 2000 according to a fourth example embodiment. Except for the following description, the information processing apparatus 2000 according to the fourth example embodiment have the same functions as the information processing apparatus 2000 according to one of the first to third example embodiments and a combination thereof.

The information processing apparatus 2000 of the forth example embodiment further includes a fourth display control unit 2120. The fourth display control unit 2120 displays an indication representing a direction in which the inspection spot 50 is located on the display device 10 when the inspection spot 50 corresponding to an inspection item is not contained in the captured image 20.

Figure 25A:
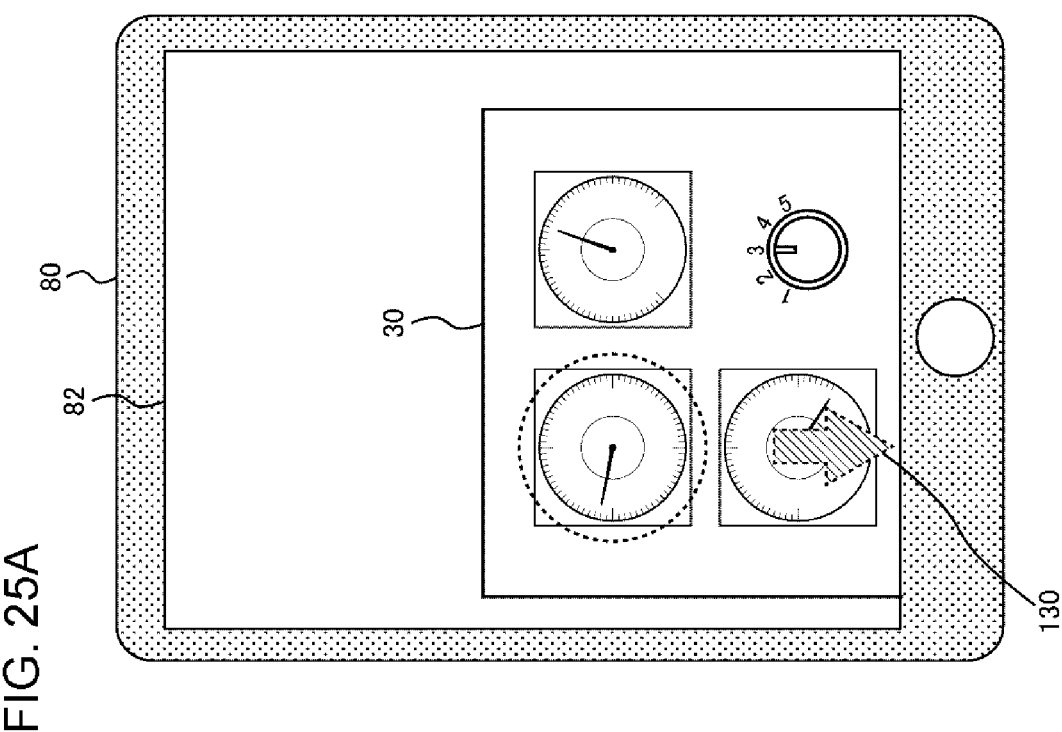
FIG. 25 are diagrams conceptually illustrating an operation of the information processing apparatus according to the fourth example embodiment.

FIG. 25 are diagrams conceptually illustrating an operation of the information processing apparatus 2000 according to the fourth example embodiment. FIG. 25A illustrates a scene in which the captured image 20 is displayed on the touch panel 82 of the tablet terminal 80 is displayed. Only a part of the instrument 30 is contained in the captured image 20. Therefore, only the part of the instrument 30 is not displayed on the touch panel 82.

Figure 25B:
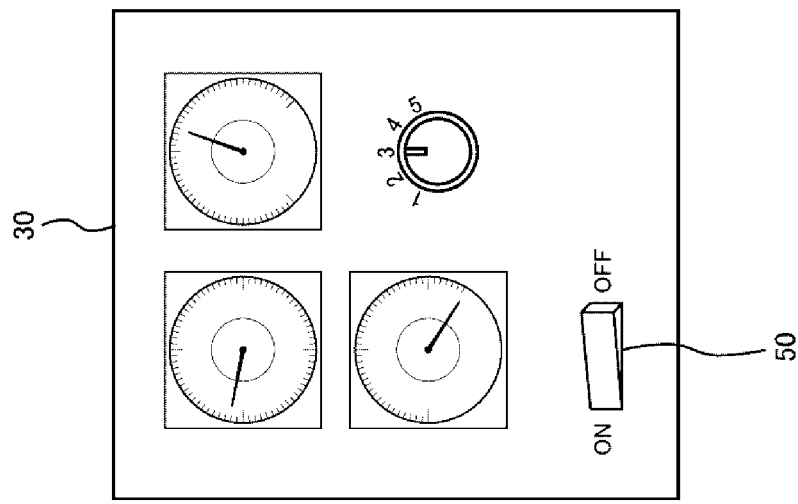

FIG. 25B illustrates the actual instrument 30. The current inspection item is the inspection spot 50 illustrated in FIG. 25B. Since the inspections spot 50 is located out of the imaging range of the camera 84, the inspection spot 50 is not contained in the captured image 20. Therefore, the inspection spot 50 is not contained on the touch panel 82 of FIG. 25A.

Accordingly, as illustrated in FIG. 25A, the fourth display control unit 2120 displays an indication 130 representing a direction in which the inspection spot 50 is located on the touch panel 82 (the display device 10). Thus, the user can recognize an approximate position of the inspection spot 50.

For example, the user turns the camera 94 toward the inspection spot 50 by executing an operation, such as tilting the tablet terminal 80 downwards with reference to the indication 130. When the inspection spot 50 enters the imaging range of the camera 94 by doing so, the information processing apparatus 2000 displays the indication 60 so that the indication 60 is superimposed on the inspection spot 50 displayed on the touch panel 82, as described in the first example embodiment or the like. As a result, the user can concretely recognize the position or the like of the inspection spot 50.

<Method of Calculating Direction in which Inspection Spot 50 is Located>

In the example embodiment, the inspection spot 208 of the inspection information 200 indicates a relative position of the inspection spot 50 on the instrument 30. A part of the instrument 30 is contained in the captured image 20. The fourth display control unit 2120 calculates the position of the inspection spot 50 on a plane determined by the captured image 20 using the part of the instrument 30 contained in the captured image 20 and the relative position of the inspection spot 50 on the instrument 30. Then, the fourth display control unit 2120 handles the position at which the indication 130 is displayed as the starting point, and the direction that is from that point to the above calculated position of the inspection spot 50 or that is close thereto as the direction that the indication 130 represents. The "direction close thereto" is, for example, a direction which is the closest, among four upper, lower, right, and left directions, to the direction of the inspection spot 50 viewed from a position at which the indication 130 is displayed.

Figure 26B:
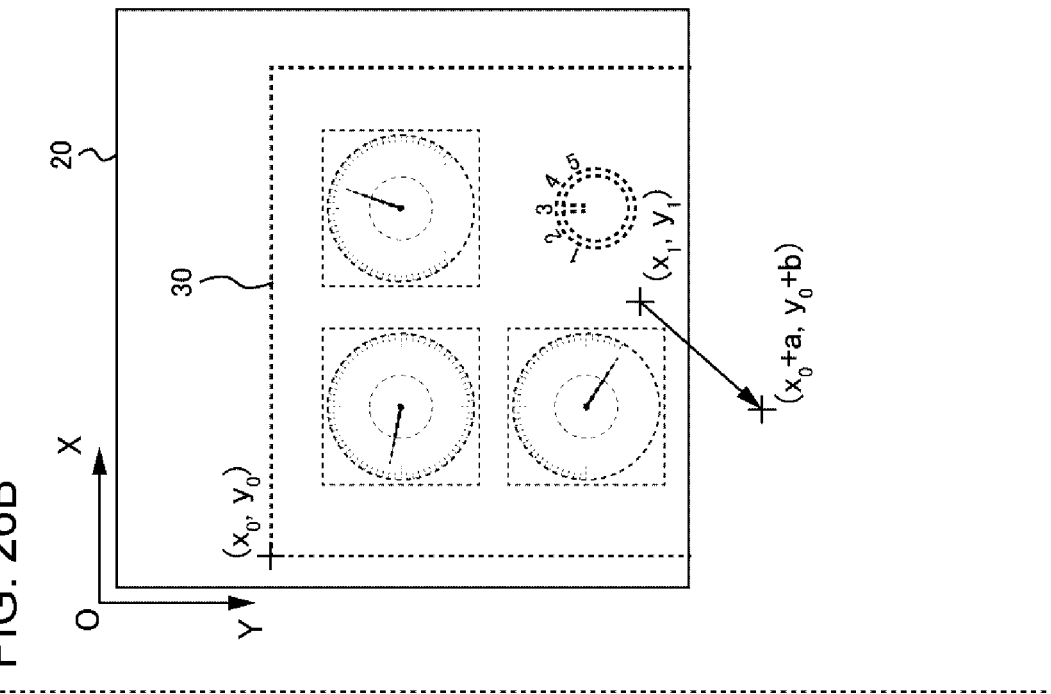
FIG. 26 are diagrams conceptually illustrating a method of calculating a direction indicated by indication.
Figure 26A:
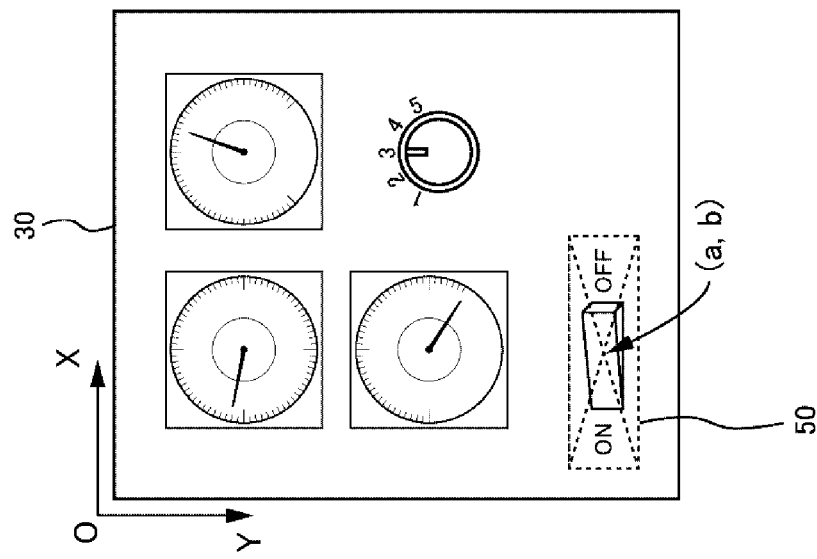

FIG. 26 are diagrams conceptually illustrating a method of calculating a direction indicated by the indication 130. FIG. 26A is diagram illustrating the position of the switch which is the current inspection spot 50 as a relative position on the instrument 30. The origin on the XY plane in FIG. 26A is the upper left end of the instrument 30. Then, the coordinates of a center of the inspection spot 50 are (a, b).

FIG. 26B is a diagram illustrating the plane determined in accordance with the captured image 20. The origin of the XY plane illustrated in FIG. 26B is the upper left end of the captured image 20. Then, the coordinates of the upper left end of the instrument 30 on the XY plane are (x0, y0) and the position at which the indication 130 is displayed is (x1, y1). The fourth display control unit 2120 calculates the coordinates of the center of the inspection spot 50 on the plane determined in accordance with the captured image 20. The coordinates are (x0+a, y0+b). Accordingly, the fourth display control unit 2120 calculates a direction the starting point of which is (x1, y1) and the ending point of which is (x0+a, y0+b) as the direction represented by the indication 130.

Figure 27:
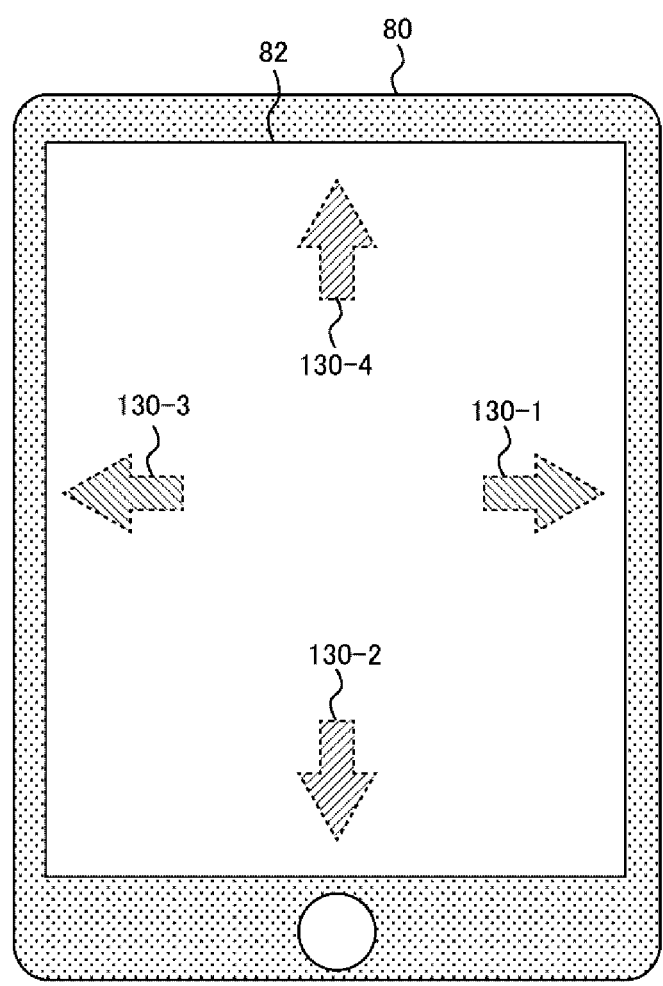
FIG. 27 is a diagram illustrating a case in which a position displaying indication is decided in accordance with the position of an inspection spot.

The position at which the indication 130 is displayed may be a predetermined position determined in advance (for example, the center or four corners of the display device 10) or may be a position determined in accordance with the position of the inspection spot 50. FIG. 27 is a diagram illustrating a case in which a position displaying indication 130 is determined in accordance with the position of an inspection spot 50. For example, when the position of the inspection spot 50 is located on the right side of a region contained in the captured image 20, the fourth display control unit 2120 displays an indication 130-1 (a rightward arrow) near the right end of the touch panel 82. For example, when the position of the inspection spot 50 is located on the lower side of the region contained in the captured image 20, the fourth display control unit 2120 displays an indication 130-2 (a downward arrow) near the lower end of the touch panel 82. The same applies to a case in which the position of the inspection spot 50 is located on the left side or the upper side of the region contained in the captured image 20.

<Flow of Process>

Figure 28:
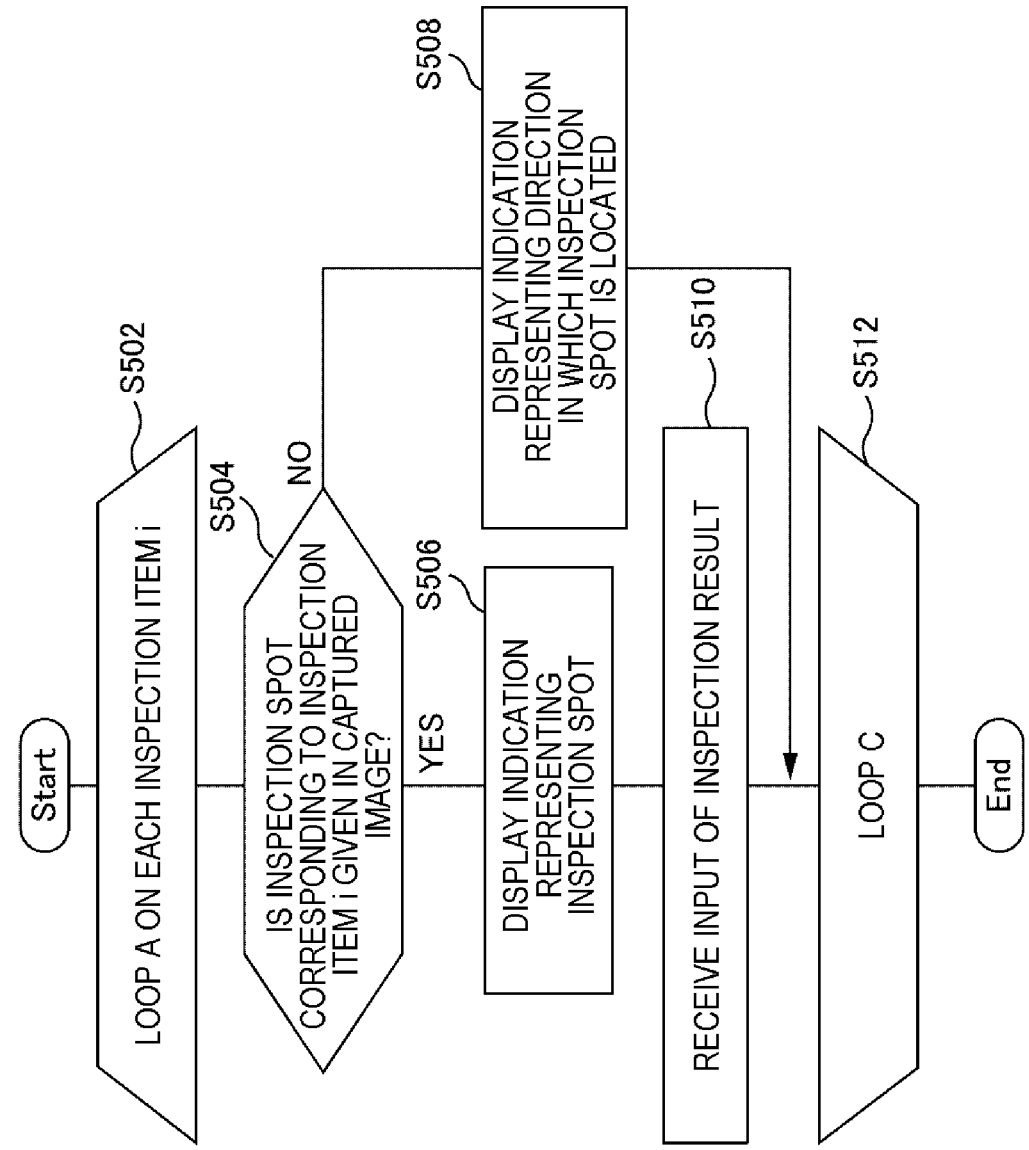
FIG. 28 is a flowchart illustrating a flow of processes executed by a fourth display control unit.

FIG. 28 is a flowchart illustrating a flow of processes executed by the first display control unit 2060 and the fourth display control unit 2120. S502 to S512 is a loop process C sequentially executed on each inspection item. In S502, the fourth display control unit 2120 determines whether the loop process C is executed on all the inspection items indicated by the inspection information 200. When the loop process C has already been executed on all the inspection items, the process of FIG. 28 ends. Conversely, when there is the inspection item which has not been a target of the loop process C yet, the fourth display control unit 2120 acquires a subsequent inspection item. Here, a subsequent inspection item is written as an inspection item i.

The fourth display control unit 2120 determines whether the inspection spot 50 corresponding to the inspection item i is contained in the captured image 20 (S504). When the inspection spot 50 corresponding to the inspection item i is contained in the captured image 20, the process of FIG. 28 proceeds to S506. Conversely, when the inspection spot 50 corresponding to the inspection item i is not contained in the captured image 20, the process of FIG. 28 proceeds to S510.

In S506, the first display control unit 2060 displays the indication 60 representing the inspection spot 50 corresponding to the inspection item i on the display device 10. The information processing apparatus 2000 receives an input of the inspection result of the inspection item i from the user (S508).

On the other hand, in S510, the fourth display control unit 2120 displays the indication 130 representing the direction in which the inspection spot 50 corresponding to the inspection item i is located on the display device 10.

S512 is a termination of the loop process C. Accordingly, the process of FIG. 28 proceeds to S502.

A method in which the fourth display control unit 2120 selects the inspection item i from the plurality of inspection items in S502 is the same as the method in which the first display control unit 2060 selects the inspection item i from the plurality of inspection items, as described in the first example embodiment.

<Advantageous Effect>

The information processing apparatus 2000 according to the present example embodiment displays the indication 130 representing the direction in which the inspection spot 50 is located on the display device 10 when the inspection spot 50 is not included in the captured image 20. The indication 130 is a clue used for the user to turn the camera 70 toward the inspection spot 50. Accordingly, even when the inspection spot 50 is not included in the imaging range of the camera 70, the user can easily recognize the inspection spot 50 by guiding the user so that the inspection spot 50 enters the imaging range of the camera 70.

Fifth Example Embodiment

Figure 29:
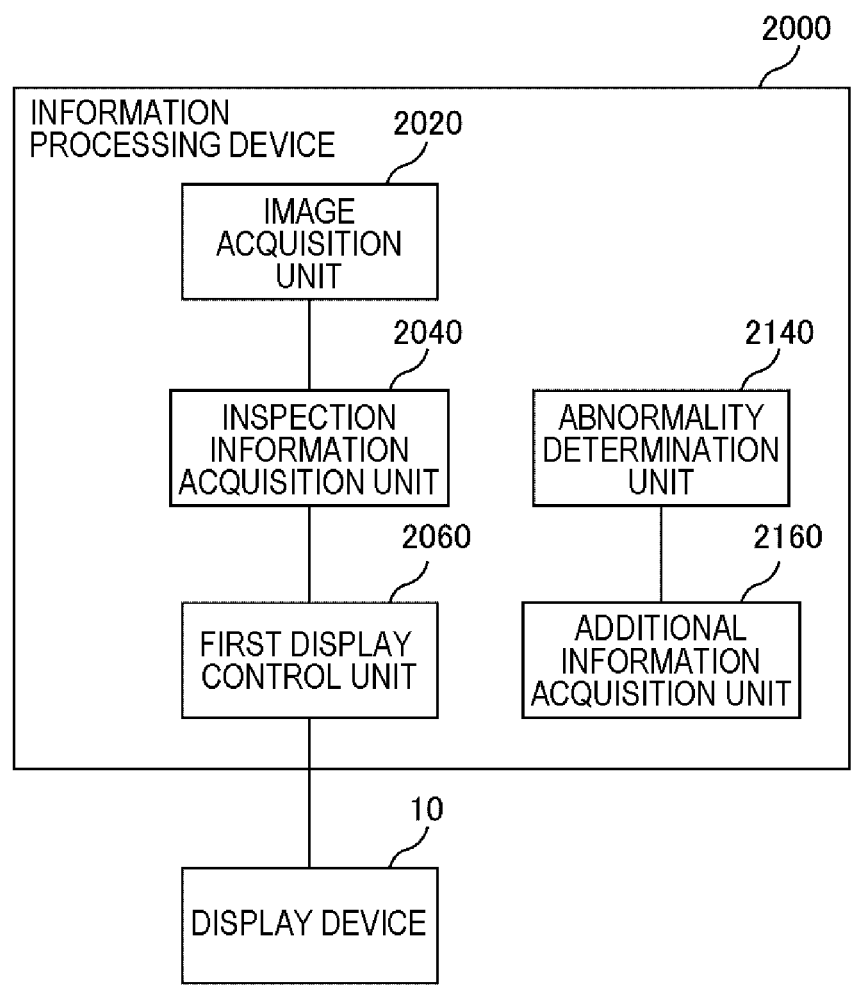
FIG. 29 is a block diagram illustrating an information processing apparatus according to a fifth example embodiment.

FIG. 29 is a block diagram illustrating an information processing apparatus 2000 according to a fifth example embodiment. Except for the following description, the information processing apparatus 2000 according to the fifth example embodiment have the same functions as the information processing apparatus 2000 according to one of the first to fourth example embodiments and a combination thereof.

The information processing apparatus 2000 according to the fifth example embodiment includes an abnormality determination unit 2140 and an additional information acquisition unit 2160. The abnormality determination unit 2140 determines whether an input of the inspection result received in regard to the inspection item is in an abnormal state. The fact that the input of the inspection result indicates the abnormal state means that, for example, the meter indicates a value not included in a range of the normal value, or the switch which has to be turn ON is turned OFF. The additional information acquisition unit 2160 acquires additional information when the input of the inspection result indicates the abnormal state.

The abnormality determination unit 2140 determines whether the input of the inspection result indicates the abnormal state using the inspection information. Therefore, the inspection information according to the present example embodiment includes information (hereinafter referred to as reference information) for recognizing a normal state or an abnormal state of the inspection spot of each inspection item. For example, the reference information indicates a range of the normal value or a range of the abnormal value of the meter or the like. For example, the reference information indicates whether the switch that is turned ON/OFF is turned ON or OFF in the normal state or whether the switch is turned ON or OFF in the abnormal state.

The additional information acquired by the additional information acquisition unit 2160 is various types of information supplied to the user when abnormality occurs in the inspection spot. For example, the additional information is inspection information indicating an inspection item which is to be additionally inspected. For example, when abnormality occurs in a certain inspection spot in the inspection work, there is another inspection spot which is to be further inspected in relation to the inspection spot. Accordingly, the additional information indicates inspection information regarding the inspection spot which is to be further inspected in this way.

For example, when abnormality occurs in the inspection spot, the additional information may be a manual or the like indicating an action which the user is to execute. For example, when the switch which is to be turned ON is turned OFF, there is a case in which an inspection worker may change the switch so that the switch is turned ON at that place and there is also a case in which a manager of the instrument is called and the manager is requested to execute treatment. Accordingly, the additional information acquisition unit 2160 acquires the manual indicating an action which is to be executed by the user as the additional information.

The information processing apparatus 2000 displays the additional information on the display device 10. For example, when the additional information is inspection information indicating the inspection item to be additionally inspected, the first display control unit 2060 executes the same process as the inspection information acquired by the inspection information acquisition unit 2040 on the inspection item indicated by the additional information. In this case, the first display control unit 2060 may execute the process on the additional information after the process on the inspection information acquired by the inspection information acquisition unit 2040 ends, or may execute the process on the additional information earlier than on the inspection information acquired by the inspection information acquisition unit 2040.

The additional information acquisition unit 2160 acquires the additional information from a storage unit that stores the additional information. The storage unit may be installed inside the information processing apparatus 2000 or may be installed outside. The storage unit installed outside may be a storage device such as a network attached storage (NAS) or a server such as a database server.

<Flow of Process>

Figure 30:
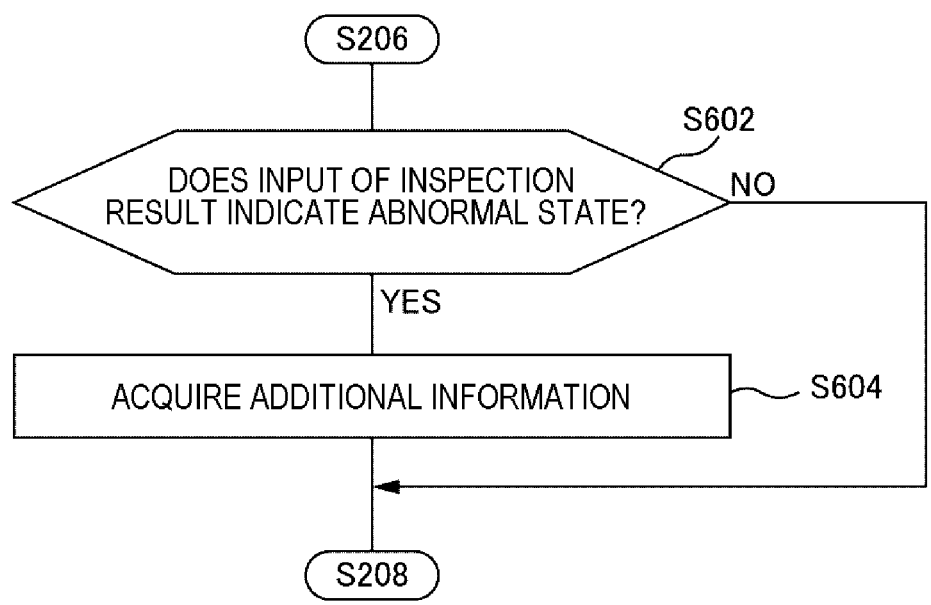
FIG. 30 is a flowchart illustrating a flow of processes executed by the information processing apparatus according to the fifth example embodiment.

FIG. 30 is a flowchart illustrating a flow of processes executed by the information processing apparatus 2000 according to the fifth example embodiment. FIG. 30 illustrates execution of S602 and S604 between S206 and S208 of FIG. 11. Here, S602 and S604 may be executed between S306 and S308 of FIG. 18 or between S508 to S512 of FIG. 28.

The abnormality determination unit 2140 determines whether the received input indicates an abnormal state (S602). When the input indicates the abnormal state (YES in S602), the additional information acquisition unit 2160 acquires the additional information (S604). Conversely, when the input indicates a normal state (NO in S602), the process of FIG. 30 ends.

<Advantageous Effect>

According to the present example embodiment, the additional information is supplied when abnormality occurs in the inspection spot. Therefore, the user inspects an additional inspection item indicated by the additional information or can execute various countermeasures such as an action in accordance with the manual indicated by the additional information. Accordingly, the user can easily ascertain an action or the like to be executed when abnormality occurs in the inspection spot.

The embodiments of the invention have been described above with reference to the drawings. The embodiments are merely examples of the invention and combinations of the foregoing embodiments or various configurations other than the foregoing configurations can also be adopted.

Hereinafter, examples of references will be appended.

1. An information processing apparatus comprising:
an image acquisition unit acquiring a captured image containing an instrument to be inspected;
an inspection information acquisition unit acquiring inspection information indicating each inspection item of the instrument contained in the captured image; and
a first display control unit displaying an indication representing an inspection spot corresponding to the inspection item indicated by the inspection information so that the indication is superimposed on the inspection spot on a display device or displays the indication in the inspection spot on the display device or near the instrument.

2. The information processing apparatus according to 1.,
wherein the inspection information indicates rankings of the plurality of inspection items, and
wherein the first display control unit displays an indication representing an inspection spot corresponding to the inspection item at a first rank on the display device and, after an inspection result of the inspection item at the first rank is input, displays an indication representing an inspection spot corresponding to the inspection item at a second rank on the display device, the second rank being a next rank of the first rank.

3. The information processing apparatus according to 1. or 2.,
wherein an identifier or a type of input interface used to input an inspection result of the inspection item is associated with each inspection item, and
wherein the information processing apparatus further comprises a second display control unit displaying an image of the input interface determined with the identifier or the type of input interface corresponding to the inspection item on the display device.

4. The information processing apparatus according to 1. or 2., further comprising a second display control unit displaying an image of an input interface receiving an input of an inspection result regarding the inspection item on the display device, when a captured image containing a marker is acquired after acquisition of the inspection information.

5. The information processing apparatus according to any one of 1. to 4., further comprising a third display control unit displaying on the display device an image which contains the instrument and in which the indication representing the inspection spot is superimposed.

6. The information processing apparatus according to 5.,
wherein the third display control unit displays on the display device the image which contains the instrument and in which the indication representing the inspection spot is superimposed, when a captured image which does not contain the instrument or a captured image which contains a marker is acquired after acquisition of the inspection information.

7. The information processing apparatus according to any one of 1. to 6., further comprising a fourth display control unit displaying on the display device an indication representing a direction in which an inspection spot not contained in the captured image is located, when the inspection spot indicated by the acquired inspection information is not contained in the captured image.

8. The information processing apparatus according to any one of 1. to 7., further comprising:
an abnormality determination unit determining whether an input of an inspection result received in regard to the inspection item indicates an abnormal state; and
an additional information acquisition unit acquiring additional information when the input of the inspection result indicates the abnormal state.

9. The information processing apparatus according to any one of 1. to 8.,
wherein the display device is a display device of a transmissive head-mounted display, and
wherein the first display control unit displays an indication representing the inspection spot at or near a position on the display device overlapping the inspection spot seen by eyes of a user through the display device.

10. The information processing apparatus according to 9.,
wherein the first display control unit performs: calculating a position of the inspection spot on the display device seen by the eyes of the user through the display device based on an angle of view of a camera generating the captured image, a positional relation between the camera and the display device, and a position of the inspection spot contained in the captured image; and displaying an indication representing the inspection spot at or near the calculated position.

11. The information processing apparatus according to any one of 1. to 10., wherein the inspection spot indicated by the inspection item is a meter, a lever, or a switch.

12. A control method executed by a computer, the method including:
   an image acquisition step of acquiring a captured image containing an instrument to be inspected;
   an inspection information acquisition step of acquiring inspection information indicating each inspection item of the instrument contained in the captured image; and
   a first display control step of displaying an indication representing an inspection spot corresponding to the inspection item indicated by the inspection information so that the indication is superimposed on the inspection spot on a display device or displays the indication in the inspection spot on the display device or near the instrument.

13. The control method described in 12.,
   wherein the inspection information indicates rankings of the plurality of inspection items, and
   wherein in the first display control step, displaying an indication representing an inspection spot corresponding to the inspection item at a first rank on the display device and, after an inspection result of the inspection item at the first rank is input, displays an indication representing an inspection spot corresponding to the inspection item at a second rank on the display device, the second rank being a next rank of the first rank.

14. The control method described in 12. or 13.,
   wherein an identifier or a type of input interface used to input an inspection result of the inspection item is associated with each inspection item, and
   wherein the control method further includes a second display control step of displaying an image of the input interface determined with the identifier or the type of input interface corresponding to the inspection item on the display device.

15. The control method described in 12. or 13., further comprising a second display control step of displaying an image of an input interface receiving an input of an inspection result regarding the inspection item on the display device, when a captured image containing a marker is acquired after acquisition of the inspection information.

16. The control method described in any one of 12. to 15., further including a third display control step of displaying on the display device an image which contains the instrument and in which the indication representing the inspection spot is further superimposed.

17. The information processing apparatus described in 16.,
   wherein in the third display control step, displaying on the display device the image which contains the instrument and in which the indication representing the inspection spot is superimposed, when a captured image which does not contain the instrument or a captured image which contains a marker is acquired after acquisition of the inspection information.

18. The control method described in any one of 12. to 17., further including a fourth display control step of displaying on the display device an indication representing a direction in which an inspection spot not contained in the captured image is located, when the inspection spot indicated by the acquired inspection information is not contained in the captured image.

19. The information processing apparatus described in any one of 12. to 18., further including:
   an abnormality determination unit determining whether an input of an inspection result received in regard to the inspection item indicates an abnormal state; and
   an additional information acquisition unit acquiring additional information when the input of the inspection result indicates the abnormal state.

20. The control method described in any one of 12. to 19.,
   wherein the display device is a display device of a transmissive head-mounted display, and
   wherein in the first display control step, an indication representing the inspection spot is displayed at or near a position on the display device overlapping the inspection spot seen by eyes of a user through the display device.

21. The control method described in 20., wherein in the first display control step, calculating a position of the inspection spot on the display device seen by the eyes of the user through the display device based on an angle of view of a camera generating the captured image, a positional relation between the camera and the display device, and a position of the inspection spot contained in the captured image; and displaying an indication representing the inspection spot at or near the calculated position.

22. The control method described in any one of 12. to 21.,
   wherein the inspection spot indicated by the inspection item is a meter, a lever, or a switch.

23. A program causing a computer to execute each step of the control method described in one of 12. to 22.

Priority is claimed on Japanese Patent Application No. 2015-220320, filed Nov. 10, 2015, the content of which is incorporated herein by reference.

What is claimed is:
1. An information processing apparatus comprising:
   a memory storing instructions, and
   a processor configured to execute the instructions to:
   acquire a captured image containing an instrument to be inspected;
   acquire inspection information indicating each inspection item of the instrument contained in the captured image;
   display an indication representing an inspection spot corresponding to the inspection item indicated by the inspection information so that the indication is superimposed on the inspection spot on a display device or displays the indication in the inspection spot on the display device or near the instrument;
   display an image of an input interface receiving, an input of an inspection result regarding the inspection item on the display device, when a captured image containing a marker is acquired after acquisition of the inspection information; and
   determine whether a captured image, acquired after acquisition of the inspection information, contains the instrument, and display on the display device an image in which the indication representing the inspection spot is superimposed on the instrument only when it is determined that the captured image, acquired after acquisition of the inspection information does not contain the instrument,
   wherein the image of an input interface is displayed at a position determined based on a position of the marker included in a captured image.

2. The information processing apparatus according to claim 1, wherein the marker is attached to a body of a user of the information processing apparatus.

3. The information processing apparatus according to claim 2, wherein the marker is a predetermined image displayed on a display device of a device attached to the user.

4. The information processing apparatus according to claim 1,
wherein the inspection information indicates rankings of a plurality of inspection items, and
wherein the processor is further configure to display an indication representing an inspection spot corresponding to the inspection item at a first rank on the display device and, after an inspection result of the inspection item at the first rank is input, display an indication representing an inspection spot corresponding to the inspection item at a second rank on the display device, the second rank being a next rank of the first rank.

5. The information processing apparatus according to claim 1,
wherein the inspection information indicates rankings of a plurality of inspection items,
wherein the processor is further configured to display on the display device the image in which the indication representing the inspection spot corresponding to the inspection item at a first rank is superimposed on the instrument, when a captured image which does not contain the instrument or a captured image which contains the marker or another marker is acquired after acquisition of the inspection information,
wherein the processor is further configured to display on the display device an image in which the indication representing an inspection spot corresponding to the inspection item at a second rank is superimposed on the instrument, when a captured image which does not contain the instrument or a captured image which contains the marker or another marker is acquired after an inspection result regarding the inspection item at the first rank is input, the second rank being a next rank of the first rank.

6. The information processing apparatus according to claim 1, wherein the processor is further configured to display on the display device an indication representing a direction in which an inspection spot not contained in the captured image is located, when the inspection spot indicated by the acquired inspection information is not contained in the captured image.

7. The information processing apparatus according to claim 1,
wherein the display device is a display device of a transmissive head-mounted display, and
wherein the processor is further configured to display an indication representing the inspection spot at or near a position on the display device overlapping the inspection spot seen by eyes of a user through the display device.

8. The information processing apparatus according to claim 7, wherein the processor is further configured to:
calculate a position of the inspection spot on the display device seen by the eyes of the user through the display device based on an angle of view of a camera generating the captured image, a positional relation between the camera and the display device, and a position of the inspection spot contained in the captured image; and display an indication representing the inspection spot at or near the calculated position.

9. The information processing apparatus according to claim 1, wherein the inspection spot indicated by the inspection item is a meter, a lever, or a switch.

10. An information processing apparatus comprising:
a memory storing instructions; and
a processor configured to execute the instructions to:
acquire a captured image containing an instrument to be inspected;
acquire inspection information indicating each inspection item of the instrument contained in the captured image;
display an indication representing an inspection spot corresponding to the inspection item indicated by the inspection information so that the indication is superimposed on the inspection spot on a display device or displays the indication in the inspection spot on the display device or near the instrument;
display an image of an input interface receiving an input of an inspection result regarding the inspection item on the display device, when a captured image containing a marker is acquired after acquisition of the inspection information;
determine whether an input of an inspection result received in regard to the inspection item indicates an abnormal state; and
acquire additional information from a storage device storing the additional information in response to the input of the inspection result indicating the abnormal state,
wherein the image of an input interface is displayed at a position determined based on a position of the marker included in a captured image.

11. A control method executed by a computer, the method comprising:
acquiring a captured image containing an instrument to be inspected;
acquiring inspection information indicating each inspection item of the instrument contained in the captured image,
displaying an indication representing an inspection spot corresponding to the inspection item indicated by the inspection information so that the indication is superimposed on the inspection spot on a display device or displays the indication in the inspection spot on the display device or near the instrument;
displaying an image of an input interface receiving an input of an inspection result regarding the inspection item on the display device, when a captured image containing a marker is acquired after acquisition of the inspection information, and
determining whether a captured image, acquired after acquisition of the inspection information, contains the instrument, and displaying on the display device an image in which the indication representing the inspection spot is superimposed on the instrument only when it is determined that the captured image, acquired after acquisition of the inspection information does not contain the instrument,
wherein the image of an input interface is displayed at a position determined based on a position of the marker included in a captured image.

12. A non-transitory computer-readable storage medium storing a program causing a computer to execute each step of the control method according to claim 11.

13. The information processing apparatus according to claim 10,
wherein the additional information includes: inspection information indicating an inspection item which is to be additionally inspected; or a manual indicating an action which the user is to execute.

14. A control method executed by a computer, the method comprising:

acquiring a captured image containing an instrument to be inspected;

acquiring inspection information indicating each inspection item of the instrument contained in the captured image;

displaying an indication representing an inspection spot corresponding to the inspection item indicated by the inspection information so that the indication is superimposed on the inspection spot on a display device or displays the indication in the inspection spot on the display device or near the instrument;

displaying an image of an input interface receiving an input of an inspection result regarding the inspection item on the display device, when a captured image containing a marker is acquired after acquisition of the inspection information;

determining whether an input of an inspection result received in regard to the inspection item indicates an abnormal state; and acquiring additional information from a storage device storing the additional information in response to the input of the inspection result indicating the abnormal state, wherein the image of an input interface is displayed at a position determined based on a position of the marker included in a captured image.

15. A non-transitory computer-readable storage medium storing a program causing a computer to execute each step of the control method according to claim 14.

* * * * *